United States Patent
Lin et al.

(10) Patent No.: US 10,732,036 B2
(45) Date of Patent: Aug. 4, 2020

(54) APPARATUS FOR DETECTING A SUBSTANCE AND METHOD OF OPERATING THE SAME

(71) Applicant: The Texas A&M University System, College Station, TX (US)

(72) Inventors: Pao T. Lin, College Station, TX (US); Ricardo Gutierrez-Osuna, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 15/614,891

(22) Filed: Jun. 6, 2017

(65) Prior Publication Data

US 2017/0350813 A1 Dec. 7, 2017

Related U.S. Application Data

(60) Provisional application No. 62/346,753, filed on Jun. 7, 2016.

(51) Int. Cl.
*G01J 3/02* (2006.01)
*G01N 21/77* (2006.01)
(Continued)

(52) U.S. Cl.
CPC ............. *G01J 3/0272* (2013.01); *G01J 3/021* (2013.01); *G01J 3/0237* (2013.01); *G01J 3/0256* (2013.01); *G01J 3/0264* (2013.01); *G01J 3/26* (2013.01); *G01J 3/42* (2013.01); *G01N 21/35* (2013.01); *G01N 21/774* (2013.01);
(Continued)

(58) Field of Classification Search
CPC .. G01J 3/0272; G01J 3/26; G01J 3/42; G01N 2021/7789
See application file for complete search history.

(56) References Cited

U.S. PATENT DOCUMENTS

2004/0051856 A1* 3/2004 Bleeker ............... G03F 7/70283
355/53
2006/0147148 A1* 7/2006 Wang .................. G01J 3/02
385/12

(Continued)

FOREIGN PATENT DOCUMENTS

WO WO-2015024065 A1 * 2/2015 ......... A61B 10/0012

OTHER PUBLICATIONS

G. Lammel, S. Schweizer, P. Renaud, "MEMS infrared gas spectrometer based on a porous silicon tunable filter," Technical Digest. MEMS 2001. 14th IEEE International Conference on Micro Electro Mechanical Systems (Cat. No. 01CH37090), Jan. 25, 2001, DOI:10.1109/MEMSYS.2001.906607 (Year: 2001).*

*Primary Examiner* — Violeta A Prieto
(74) *Attorney, Agent, or Firm* — Boisbrun Hofman, PLLC

(57) ABSTRACT

An apparatus configured to detect a substance, and method of operating and forming the same. In one embodiment, the apparatus includes a tunable resonator including an upper Bragg reflector and a lower Bragg reflector separated by a porous matrix. The tunable resonator is configured to be illuminated by a light source and produce a first spectral optical response from a substance absorbed within the porous matrix. The apparatus also includes a detector positioned proximate the tunable resonator configured to provide a first absorption signal representing the first spectral optical response.

20 Claims, 22 Drawing Sheets

(51) Int. Cl.
　　　*G01J 3/42*　　　(2006.01)
　　　*G01J 3/26*　　　(2006.01)
　　　*G01N 21/35*　　(2014.01)

(52) U.S. Cl.
　　　CPC ............... *G01N 2021/7723* (2013.01); *G01N 2021/7789* (2013.01); *G01N 2201/0221* (2013.01)

(56) References Cited

U.S. PATENT DOCUMENTS

| | | | | |
|---|---|---|---|---|
| 2009/0244532 | A1* | 10/2009 | Letant | B82Y 20/00 356/244 |
| 2011/0128537 | A1* | 6/2011 | Bond | B82Y 20/00 356/301 |
| 2012/0078523 | A1* | 3/2012 | Letant | G01N 21/658 702/19 |
| 2015/0037815 | A1* | 2/2015 | Miller | G01N 33/54373 435/7.4 |
| 2015/0132870 | A1* | 5/2015 | Kalem | H01L 29/7831 438/22 |
| 2016/0139038 | A1* | 5/2016 | Oldsen | G01N 21/45 356/454 |
| 2016/0213791 | A1* | 7/2016 | Voelker | A61B 10/0012 |
| 2017/0012199 | A1* | 1/2017 | Sabry | H01L 49/00 |
| 2017/0237234 | A1* | 8/2017 | Han | H01L 33/32 372/45.012 |
| 2019/0285552 | A1* | 9/2019 | Zhang | G02B 6/1225 |

\* cited by examiner

APPARATUS FOR DETECTING A SUBSTANCE AND METHOD OF OPERATING THE SAME

This application claims the benefit of U.S. Provisional Application No. 62/346,753 entitled "APPARATUS FOR DETECTING A SUBSTANCE AND METHOD OF OPERATING THE SAME," filed Jun. 7, 2016, which is incorporated herein by reference.

TECHNICAL FIELD

The present invention relates to an apparatus including a tunable resonator with a porous matrix for detecting a substance, and method of operating and forming the same.

BACKGROUND

When large numbers of people congregate at entertainment events or public transportation facilities, detecting exposure to possibly hazardous or otherwise unknown substances presents important real-time security and safety challenges. Infected patients in healthcare facilities present similar challenges of identifying possibly hazardous or contagious substances. A monitor that can detect and identify an unknown, possibly hazardous or contagious, substance would be beneficial, especially in the aforementioned environments.

Conventional monitors require labeling a reagent for each chemical of interest, for instance, via fluorescence. The conventional monitors are generally based on gas chromatography, ion mobility spectroscopy and Raman spectroscopy, which are bulky and power hungry instruments. An alternative, label-free approach includes analyzing a unique absorption spectrum of each substance of interest in a mid-infrared region. The mid-infrared spectroscopy enables simultaneous identification and quantification of a plurality of substances, even in the presence of interferences. At present, however, the mid-infrared spectroscopy requires bench-top optical instruments (e.g., Fourier transform infrared spectroscopy), which are substantial in size and unsuitable for wearable monitors.

Current designs generally lead to monitors with high power demand that are not wearable and/or mobile for in-situ substance (e.g., chemical and gas) detection. Accordingly, what is needed in the art is an improved monitor that can detect hazardous substances in real time that overcomes deficiencies of the prior art.

SUMMARY

These and other problems are generally solved or circumvented, and technical advantages are generally achieved, by advantageous embodiments of the present invention, including an apparatus configured to detect a substance, and method of operating and forming the same. In one embodiment, the apparatus includes a tunable resonator including an upper Bragg reflector and a lower Bragg reflector separated by a porous matrix. The tunable resonator is configured to be illuminated by a light source and produce a first spectral optical response from a substance absorbed within the porous matrix. The apparatus also includes a detector positioned proximate the tunable resonator configured to provide a first absorption signal representing the first spectral optical response.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

DETAILED DESCRIPTION OF ILLUSTRATIVE EMBODIMENTS

Figure 1:
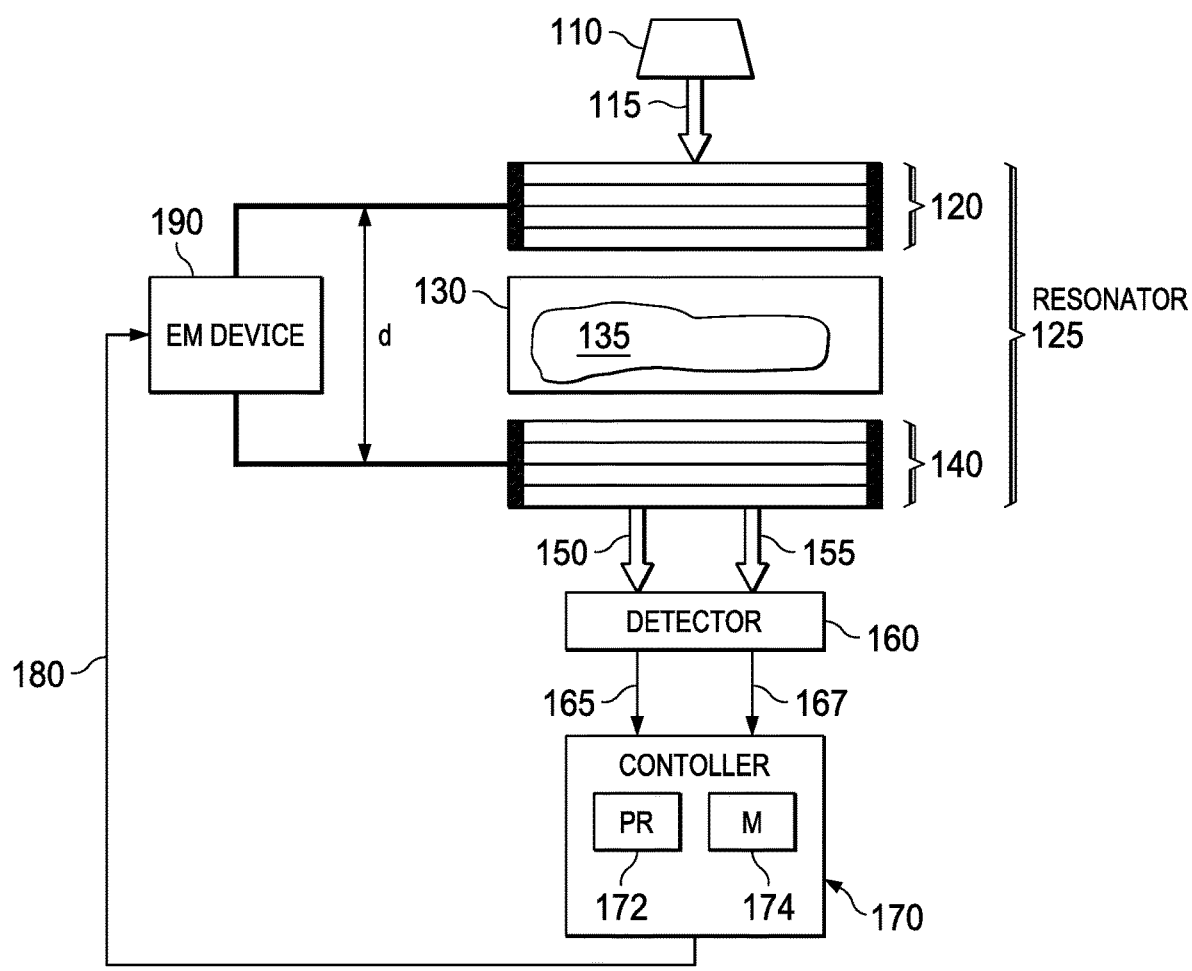
FIGS. 1 and 2 illustrate block diagrams of embodiments of an apparatus for detecting a substance.

The making and using of the presently preferred embodiments are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Embodiments will be described in a specific context, namely, an apparatus including a tunable resonator including an upper and lower Bragg reflector separated by a porous matrix and a detector for detecting a substance absorbed within the porous matrix, and method of operating and forming the same. The apparatus may be a mid-infrared ("MIR") wearable and/or mobile chemical sensor ("WCS") constructed with the Bragg reflector resonator and the porous matrix such as a nano-composite or nano-porous matrix. While the principles of the present invention will be described in the environment of detecting an unknown substance, any application or related technology that may benefit from an apparatus that can detect or otherwise characterize a substance is well within the broad scope of the present invention.

As introduced herein, a monitor for detecting substances that may be hazardous or contagious in real time is described. The monitor enables miniaturization of MIR spectroscopy to the chip level ("spectrometer-on-a-chip") and includes a resonator such as a photonic Fabry-Perot resonator to boost sensitivity, a porous matrix to enhance selectivity, and active-sensing algorithms to reduce false positives and power consumption by selectively scanning absorption spectra of light emanating from the resonator. The monitor can be used in a variety of scenarios that include detecting hazardous chemicals and environmental pollutants, monitoring air and water quality, and performing rapid diagnoses of diseases, all in a chip-scale package that is small enough to be integrated into a wearable, mobile, or internet-of-things device.

A widely applicable monitor is introduced that can simultaneously screen various substances such as toxic, gaseous substances or bio-chemical trace substances. Unlike current technologies (which generally detect only one type of chemical), the monitor introduced herein can perform parallel detection of multiple substances, making it highly desirable for several industry sectors, from healthcare to homeland security.

The device integrates processes in four areas, namely, material synthesis, nano-device fabrication, optical engineering, and intelligent data analysis. Specifically, the device includes materials to trap chemical species of interest, thereby enhancing chemical sensitivity. Nano-scale fabrication processes are used that are compatible with complementary metal-oxide semiconductor ("CMOS") fabrication, making it possible for the monitor to be manufactured on a large-scale. Chip-scale photonic components (e.g., microcavity, nano-resonators) are employed to confine and amplify a probe light, thereby enhancing light-analyte interaction and overall system sensitivity. The active-sensing algorithms are employed to reduce energy consumption and interference from chemical backgrounds.

The porous matrix may include nano-composite or nano-porous ("NC/NP") matrices such as nano-porous templates, polymer matrices with metal nano-particles to provide selective absorption, and zeolites with sub-nanometer pores to increase surface area. In an embodiment, the metal nano-particles are formed, without limitation, with palladium ("Pd").

A resonator such as a chip-scale Fabry-Perot ("FP") interferometer ("FPI") is used whose electromagnetic field is spatially collocated with an absorbed target gas species. The device includes three layers. The upper and lower layers are distributed Bragg reflectors ("DBR") to create an FP interferometer, and an intermediate layer is a porous matrix to trap target molecules. The DBRs are formed with refractive-index alternated multilayers. The DBRs are engineered with alternative dielectric layers with photonic wavelengths that match characteristic photonic absorption bands of target analytes. The DBRs can be adjustably separated by an electromechanical device to enable the FP interferometer to be tuned.

Light from a broadband MIR source atop the upper DBR reflector enters the porous matrix to interact with trapped molecules of the unknown substance, and eventually emits from the lower DBR to reach a detector such as a MIR photonic detector. Due to molecule trapping, the monitor can perform detection in less than 30 seconds. Furthermore, it can be operated in an environment with temperatures between −30 to 80 degrees Celsius. Atmospheric water vapor will generally not affect sensitivity since absorption bands of water and target substances generally do not overlap. The monitor may have a volume less than 200 cubic centimeters ("$cm^3$") and weight less than 0.25 kilograms ("kg"). Using commercial off-the-shelf ("COTS") batteries, the monitor can be operated for 24 continuous hours without a recharge.

The active-sensing algorithms are employed to select absorption wavelengths in real time based on past measurements. The approach combines information from multiple wavelengths (selected and measured sequentially) to estimate the probability of each target analyte. This probability estimate is then used to select the next wavelength in real time. In this fashion, the active-sensing algorithms can adapt to changes in its environment (e.g., noise levels, background substances), while balancing power consumption and false positive rates. The active-sensing algorithms tune the resonator towards specific absorption bands. This approach allows minimization of the number of measurements needed and, therefore, reduces power consumption, which is an important characteristic for a mobile monitor.

Device layouts of the resonator are identified to obtain a spectral response for label-free detection. The device layout includes a pair of alternating refractive-index multilayers, between which includes a porous matrix such as a layer of nano-composite/nano-porous materials that have large surface areas and strong chemical absorption to enhance absorption. By selecting the layer thickness, periodicity, layer materials, and mechanically adjusting their physical separation, the wavelength of the resonator can be tuned. The resonator can select specific probe MIR wavelengths to match the characteristic absorption of target molecules to perform label-free detection. The monitor is a spectrometer-on-a-chip so it can identify molecules as well as chemical functional groups by monitoring the spectral intensity variation corresponding to various fingerprint absorption bands.

Referring initially to FIG. 1, illustrated is a block diagram of an embodiment of an apparatus for detecting a substance. The apparatus includes a tunable resonator 125 including an upper Bragg reflector 120 and a lower Bragg reflector 140 separated by a porous matrix 130 configured to be illuminated by a light source 110 (via an optical channel 115 such as an optical fiber) and produce a first spectral optical response 150 from a substance 135 absorbed within the porous matrix 130. The light source 110 may be a broadband MIR light source such as an incandescent or light emitting diode ("LED") light source. The tunable resonator 125 is tuned to match characteristic absorption spectra of the substance 135 such as a target analyte. The upper Bragg reflector 120 and the lower Bragg reflector 140 may include multiple layers and forms the tunable resonator (e.g., a tunable Fabry-Perot interferometer) with molecular trapping of the substance 135 in the porous matrix 130. The porous matrix 130 may include, without limitation, a porous oxide and metallic nanoparticles, a polymer matrix and metallic nanoparticles, and a zeolite. The apparatus also includes a detector 160 positioned proximate (e.g., below) the resonator 125 configured to provide a first absorption signal 165 representing the first spectral optical response 150.

The apparatus also includes a controller 170 configured to receive the first absorption signal 165 representing the first spectral optical response 150 and provide a control signal 180 to an electromechanical ("EM") device 190 to alter a distance ("d") between the upper Bragg reflector 120 and the lower Bragg reflector 140 to tune the tunable resonator 125 to a desired wavelength. The controller 170 may select the control signal 180 to enable the detector 160 to provide a second absorption signal 167 representing a second spectral optical response 155 from the substance 135. Thus, by altering the distance d between the upper Bragg reflector 120 and the lower Bragg reflector 140, a second spectral optical response 155 associated with the substance 135 from the tunable resonator 125 enables the detector 160 to provide a second absorption signal 167 for processing by the controller 170. For instance, the controller 170 is configured to estimate a probability of and/or identify a type of the substance 135 from the first absorption signal 165 and the second absorption signal 167. As described below, the apparatus may be coupled to a band configured to enable the apparatus to be attached to an extremity of a person, or be a part of a handheld unit.

The controller 170 includes a processor ("PR") 172 and memory ("M") 174 that cooperate to produce the control signal(s) 180 from the first absorption signal 165 and/or the second absorption signal 167. The processor 172 may be embodied as any type of processor and associated circuitry configured to perform one or more of the functions described herein. For example, the processor 172 may be embodied as or otherwise include a single or multi-core processor, an application specific integrated circuit, a collection of logic devices, or other circuits. The memory 174 may be embodied as read-only memory devices and/or random access memory devices. For example, the memory 174 may be embodied as or otherwise include dynamic random access memory devices ("DRAM"), synchronous dynamic random access memory devices ("SDRAM"), double-data rate dynamic random access memory devices ("DDR SDRAM"), and/or other volatile or non-volatile memory devices. The memory 174 may have stored therein programs including a plurality of instructions or computer program code for execution by the processor 172 to control particular functions of the apparatus.

Figure 2:
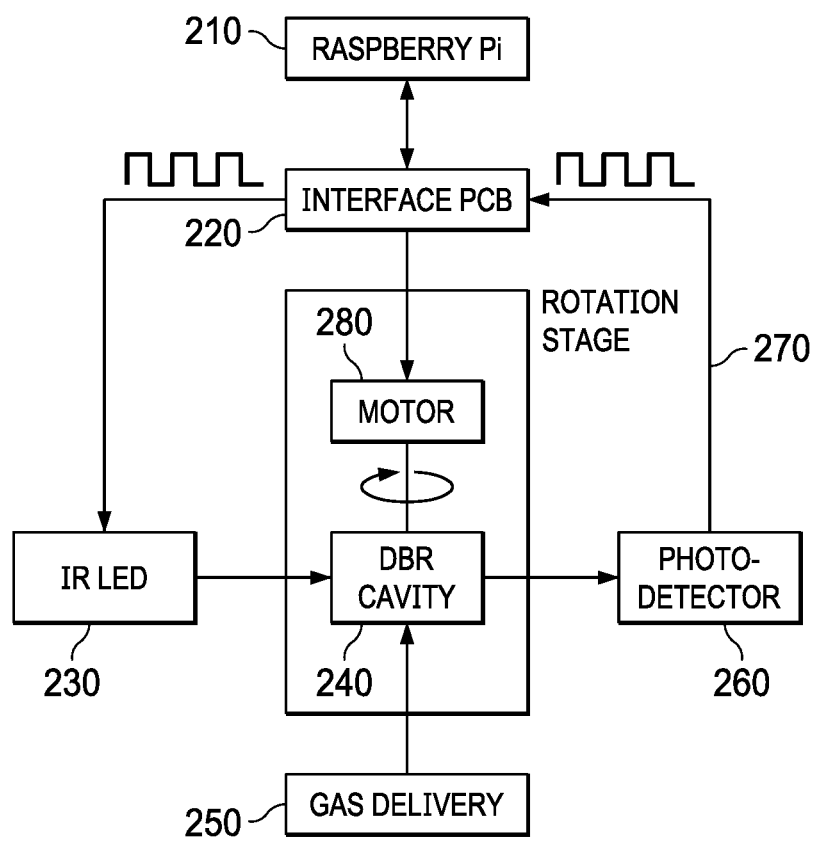

Turning now to FIG. 2, illustrated is a block diagram of an embodiment of an apparatus for detecting a substance. A controller 210 is embodied in a Raspberry Pi single-board computer. The controller 210 is coupled to an interface printed circuit board ("PCB") 220 that in turn is coupled to an infrared ("IR") light emitting diode ("LED") 230. The IR LED 230 illuminates a DBR cavity 240 that is coupled to a gas delivery source 250. Light emitted from the DBR cavity 240 is detected by a photo detector 260 that in turn returns an absorption signal(s) 270 to the interface PCB 220. The interface PCB 220 is coupled to a motor 280 (an electromechanical device) that is configured to rotate the DBR cavity 240 with respect to an angle of incidence of light produced by the IR LED 230 relative to an upper Bragg reflector and a lower Bragg reflector (see, e.g., FIG. 1).

Figure 3:
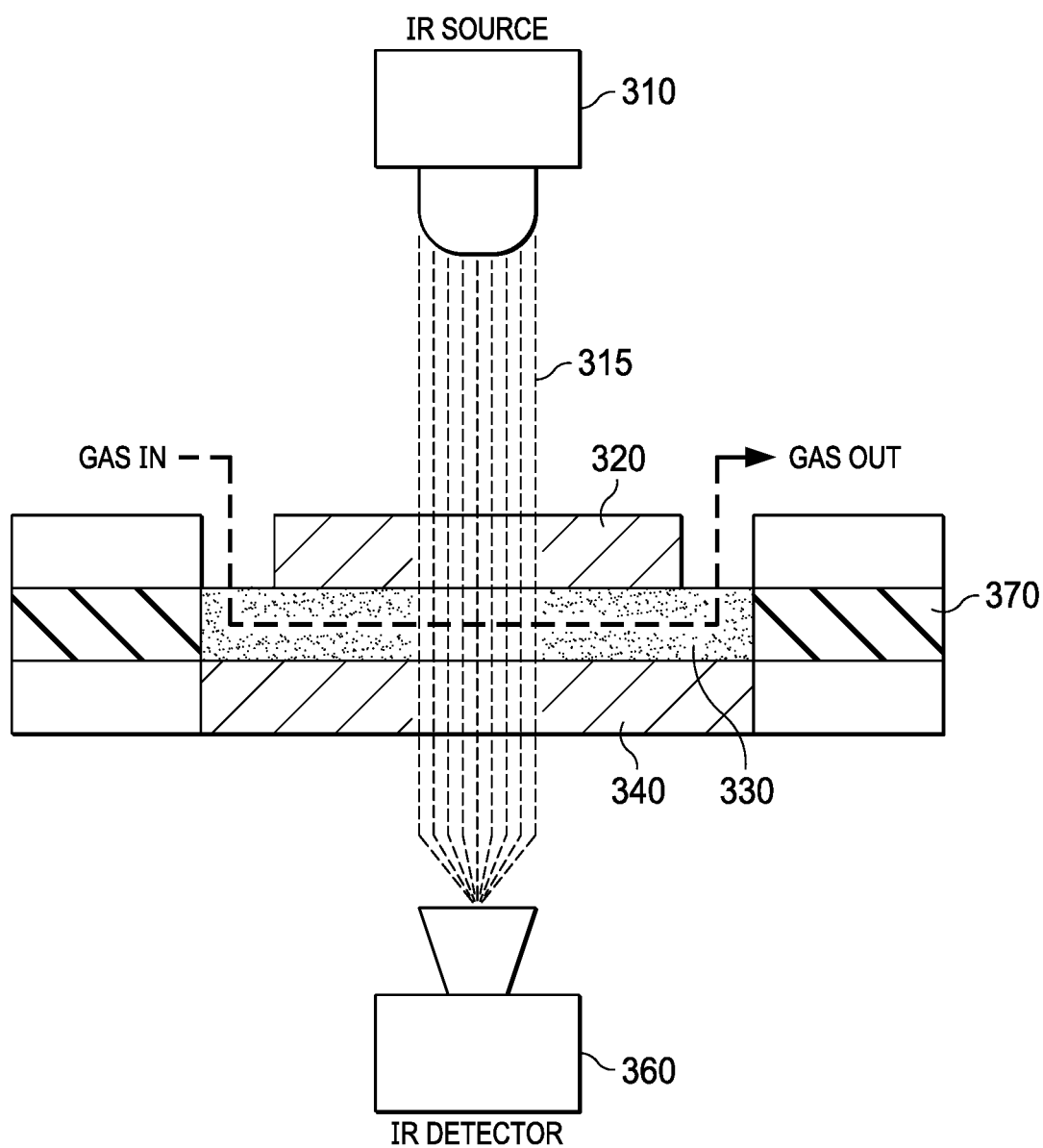
FIG. 3 illustrates a schematic diagram of an embodiment of an apparatus for detecting a substance.

Turning now to FIG. 3, illustrated is a schematic diagram of an embodiment of an apparatus for detecting a substance. The apparatus includes an IR source 310 and an IR detector 360, an upper Bragg reflector 320 and a lower Bragg reflector 340, and a porous matrix 330 formed from a sorbent material (e.g., zeolite). The combination of two DBRs constitutes a Fabry-Perot Interferometer ("FPI") used as the optical resonator. The optical channel is shown in the middle with the thick line 315. A flexible layer 370 is formed about the porous matrix 330. A gas flows through the porous matrix 330 as shown by a "gas in" and "gas out."

Figure 4:
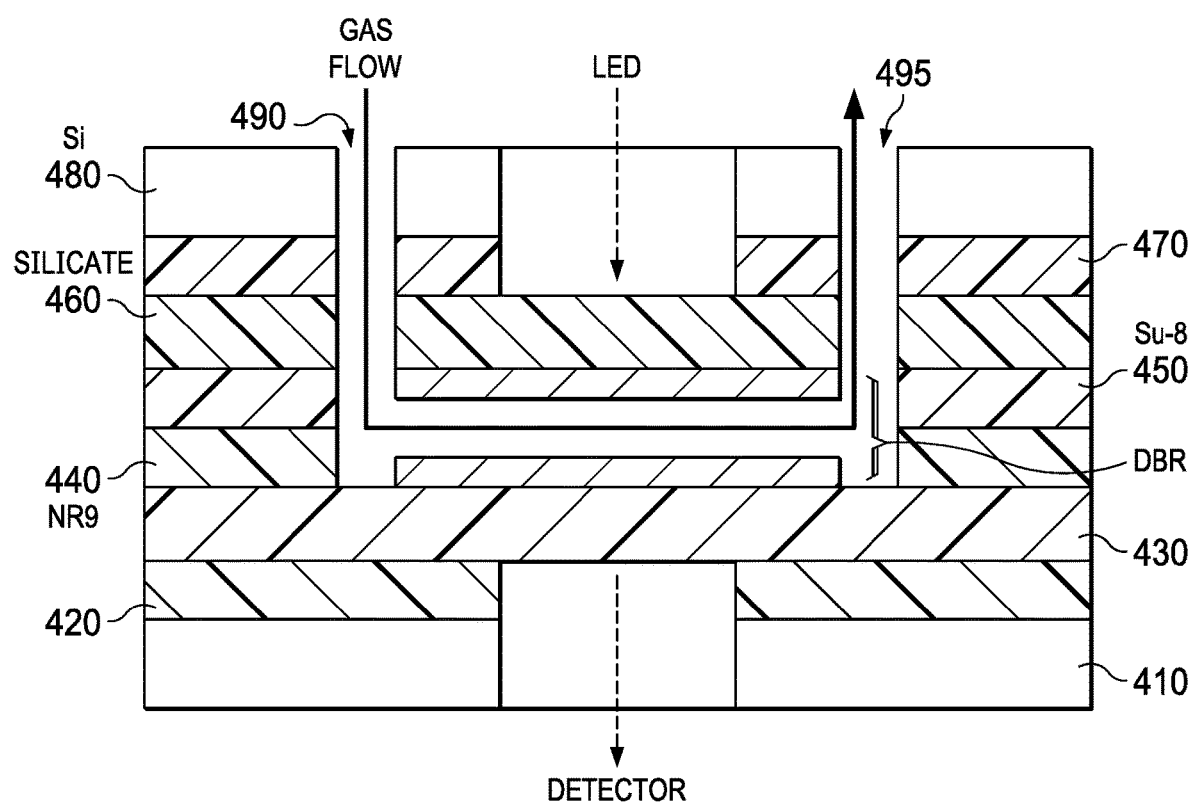
FIG. 4 illustrates a cross sectional view of an embodiment of an apparatus for detecting a substance.

Turning now to FIG. 4, illustrated is a cross sectional view of an embodiment of an apparatus for detecting a substance. FIG. 4 illustrates exemplary layers that form at least a portion of a FPI. The FPI is formed with a first silicon layer 410 on which is deposited a first photoresist layer 420 formed of a material NR9, available from Futurrex. A first silicate layer 430 is deposited above the first photoresist layer 420. A second photoresist layer 440 of the material NR9 is deposited above the first silicate layer 430. A third photoresist layer 450 of Su-8 composition is deposited above the second photoresist layer 440. A second silicate layer 460 is deposited above the third photoresist layer 450. A fourth photoresist layer 470 of the material NR9 is deposited above the second silicate layer 460. Finally, a second silicon layer 480 is deposited above the fourth photoresist layer 470. The distributed Bragg reflector ("DBR") through which the analyte gas flows is formed between the first and second silicon layers 430, 460. The gas enters the DBR through a gas flow entry 490 and exits the DBR through a gas flow exit 495.

Figure 5:
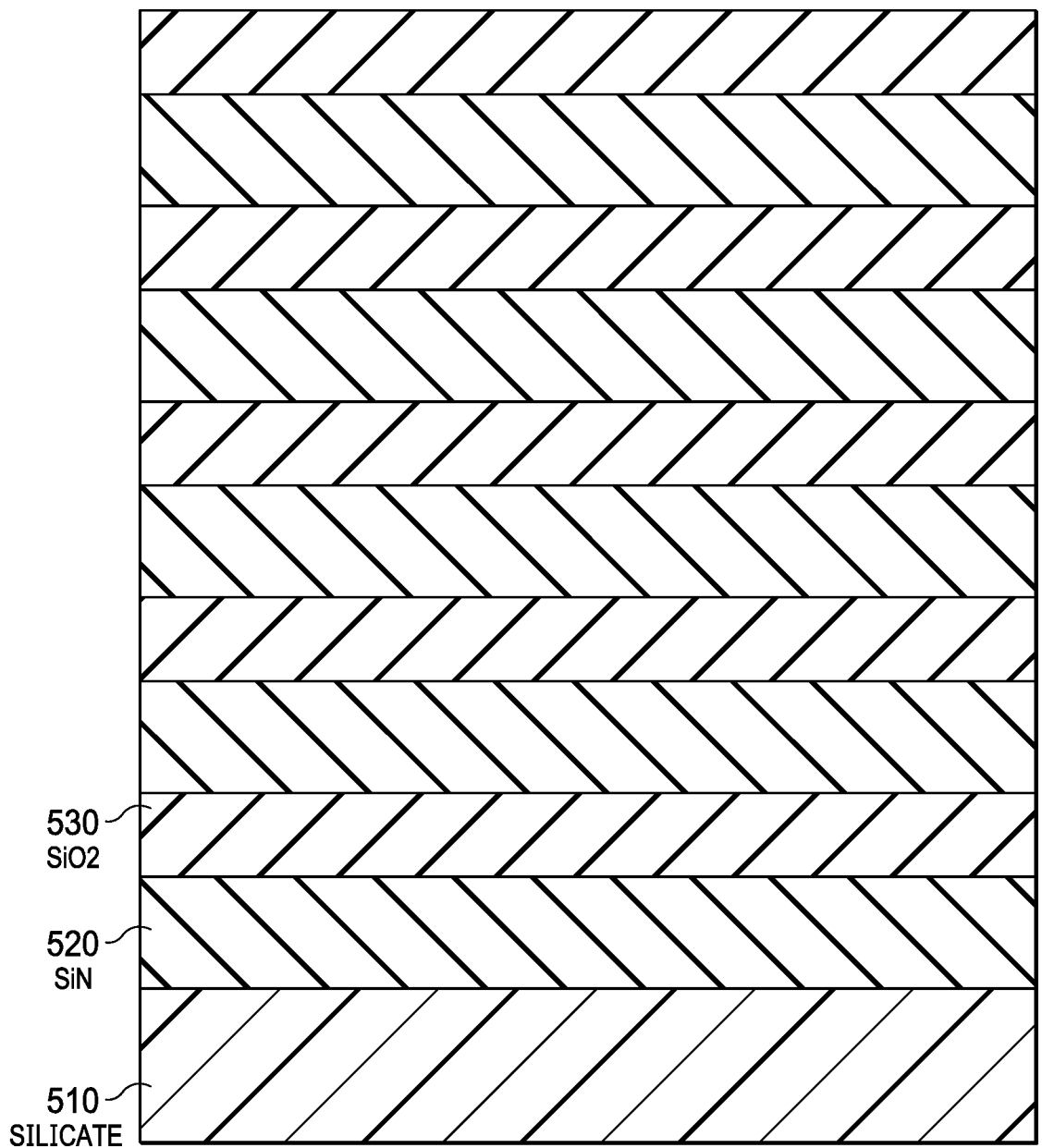
FIG. 5 illustrates a cross sectional view of an embodiment of a distributed Bragg reflector.

Turning now to FIG. 5, illustrated is a cross sectional view of an embodiment of a distributed Bragg reflector ("DBR"). The DBR with a base silicate layer 510. Above the base silicate layer 510 are alternating layers of silicon nitride ("SiN," one of which is designated 520) and silicon dioxide ("SiO2," one of which is designated 530). A typical thickness of the alternating layers of silicon nitride 520 and silicon dioxide 530 is about 500 nanometers ("nm").

Figure 6:
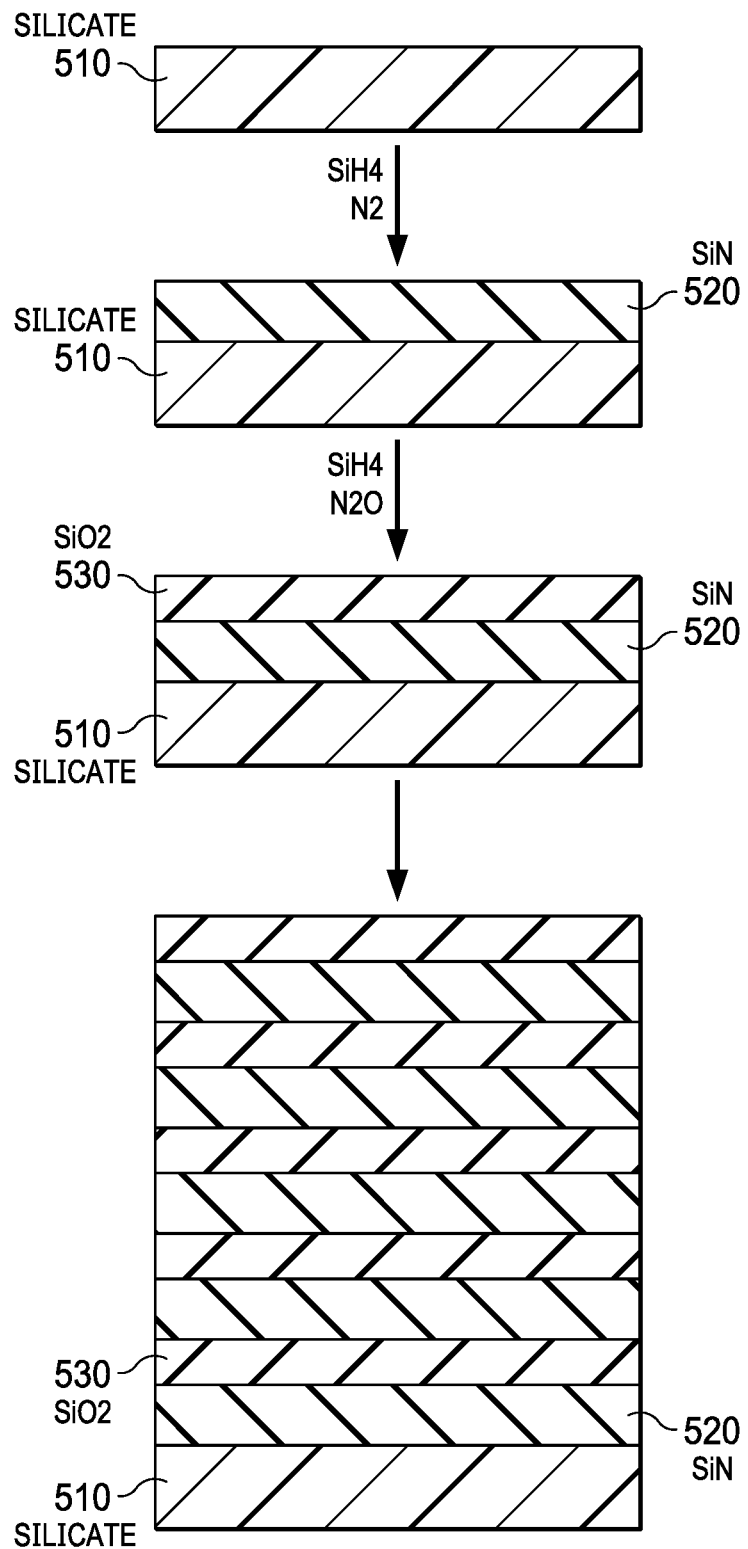
FIG. 6 illustrates an expanded cross sectional view of an embodiment of forming the distributed Bragg reflector of FIG. 5.

Turning now to FIG. 6, illustrated is an expanded cross sectional view of an embodiment of forming the DBR of FIG. 5. The process begins with the base silicate layer 510. The base silicate layer 510 is exposed to silane ("SiH4") and nitrogen ("N2") to form the silicon nitride 520 layer thereabove. The silicon nitride 520 layer is exposed to silane ("SiH4") and nitrous oxide ("N2O") to form the silicon dioxide 530 layer thereabove. The steps are repeated several times to form the alternating layers of the DBR.

Figure 7:
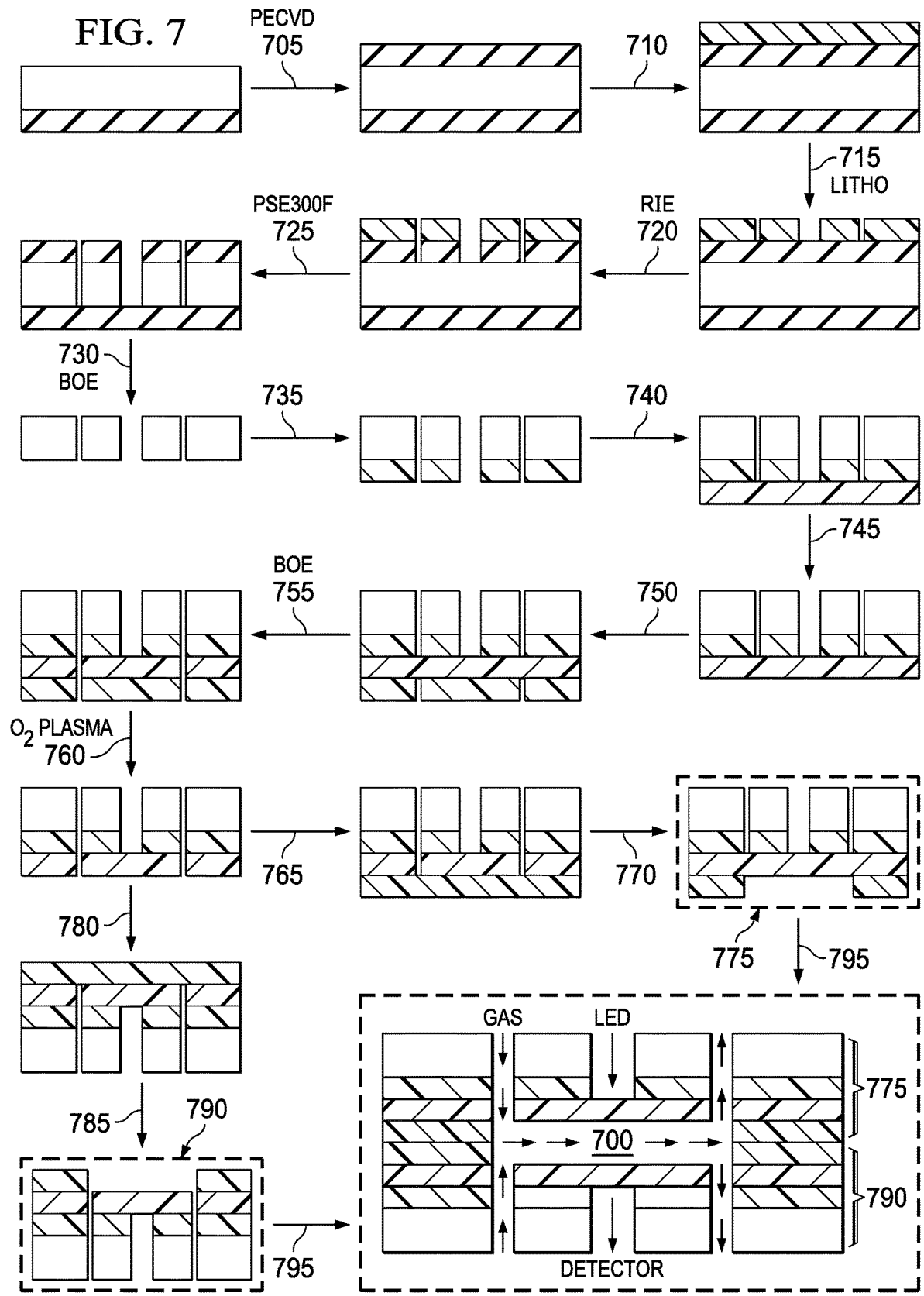
FIG. 7 illustrates a cross sectional view of an embodiment of a method of forming a portion of an apparatus for detecting a substance.

Turning now to FIG. 7, illustrated is a cross sectional view of an embodiment of a method of forming a portion of an apparatus for detecting a substance. FIG. 7 illustrates exemplary layers that form at least a portion of a FPI including a cavity 700 for receiving a porous matrix where gas (designated by arrows) flows therethrough. The process begins with a silicon dioxide ("SiO2") layer on a surface of a silicon ("Si") layer. Another silicon dioxide layer is deposited over another surface of the silicon layer by plasma-enhanced chemical-vapor deposition ("PECVD") at a step 705. A photoresist layer of Su-8 composition is spin coated over the silicon dioxide layer at a step 710. During a step 715, lithography is performed on the photoresist layer of Su-8 composition. During a step 720, a reactive ion etched ("RIE") process is performed on the silicon dioxide. After the photoresist layer of Su-8 composition is removed, the silicon layer is etched with PSE300F at a step 725. During a step 730, the silicon dioxide layers are removed employing a buffered oxide etch ("BOE"). A photoresist layer of NR9 composition is spin coated on the silicon layer at a step 735.

A silicate layer is bonded to the photoresist layer of NR9 composition at a step 740, which is repeated at a step 745. During a step 750, another photoresist layer of NR9 composition is spin coated on the silicate layer. The silicate layer is then etched by a buffered oxide etch at a step 755. One of the photoresist layers of NR9 composition is removed by an oxygen plasma etching process at a step 760.

For an upper portion (generally designated 775) of the apparatus, a photoresist layer of Su-8 composition is spin coated over the silicate layer at a step 765, which is patterned via lithography at a step 770. For a lower portion (generally designated 790) of the apparatus, a photoresist layer of NR9 composition is spin coated over the silicate layer at a step 780, which is patterned via lithography at a step 785. The upper and lower portions 775, 790 are bonded together at a step 795. While not shown, the apparatus includes upper and lower DBRs between the silicate layers (see, e.g., FIG. 4).

Figure 8:
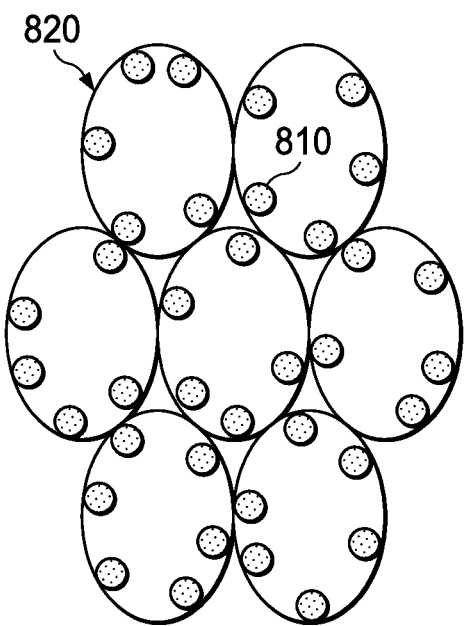
FIGS. 8 to 10 illustrate diagrams of embodiments of porous matrices of a tunable resonator.
Figure 9:
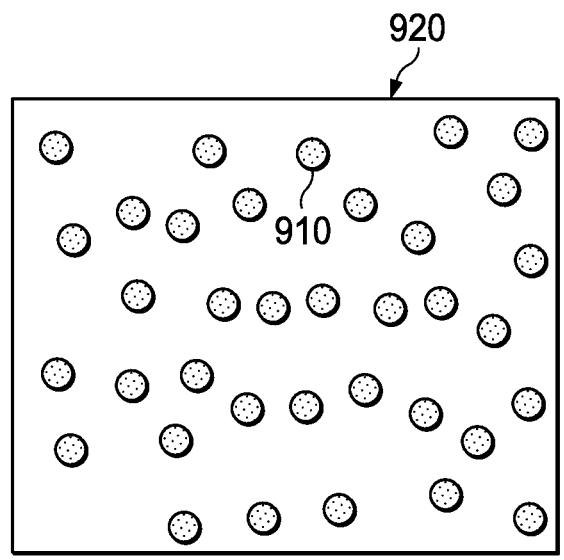
Figure 10:
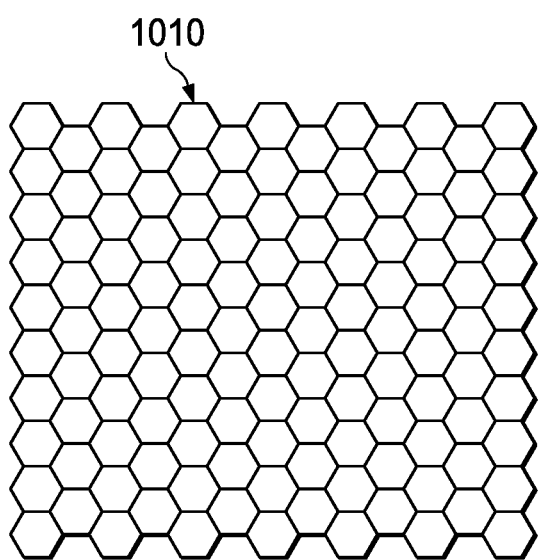

Turning now to FIGS. 8 to 10, illustrated are diagrams of embodiments of porous matrices of a tunable resonator. FIG. 8 illustrates palladium nanoparticles 810 embedded in a porous oxide 820 such as aluminum oxide. FIG. 9 illustrates palladium nanoparticles 910 embedded in a permeable polymer matrix 920 such as a polystyrene, polyethylene, or poly(glycidyl methacrylate) permeable matrix. FIG. 10 illustrates a zeolite 1010 including sub-nanometer cavities. Various compositions of a zeolite such as Mordenite Framework Inverted ("MFI") may be employed. In an embodiment, other particle types such as other heavy metal particles can be employed in place of palladium.

Figure 11:
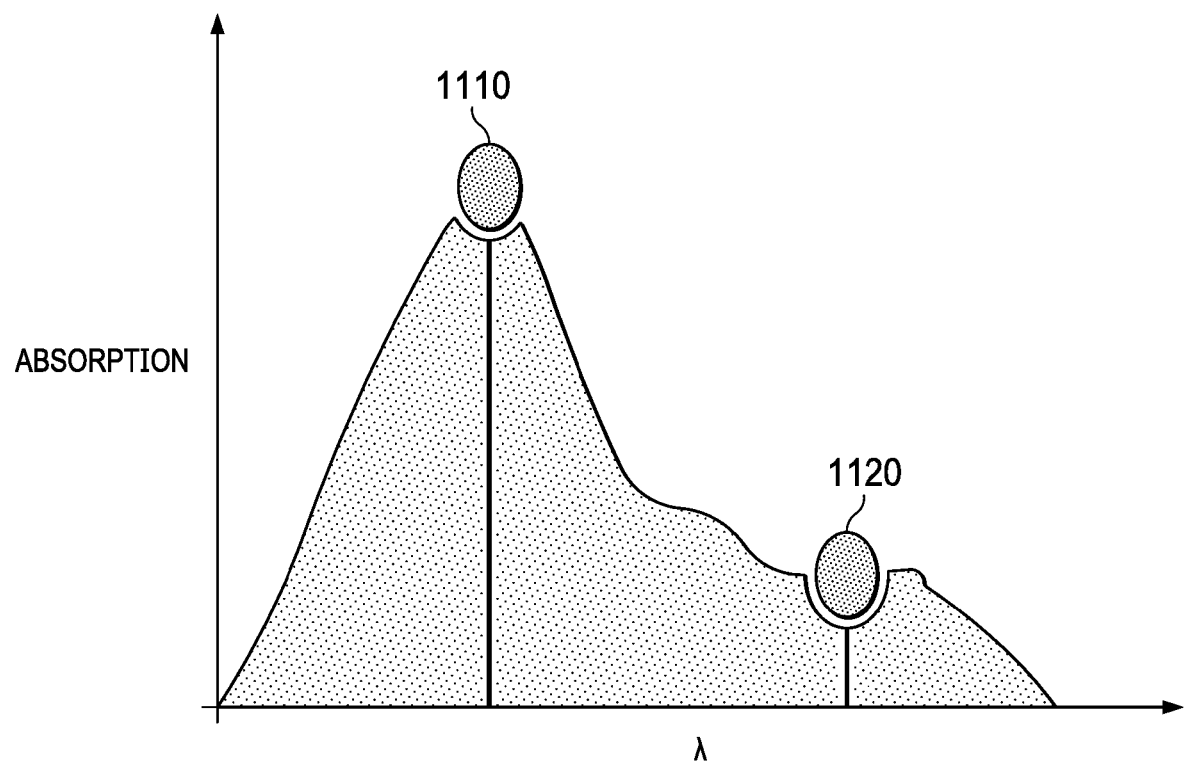
FIGS. 11 to 12 illustrate diagrams showing, respectively, absorption and probability diagrams that support a method for detecting or identifying a substance.
Figure 12:
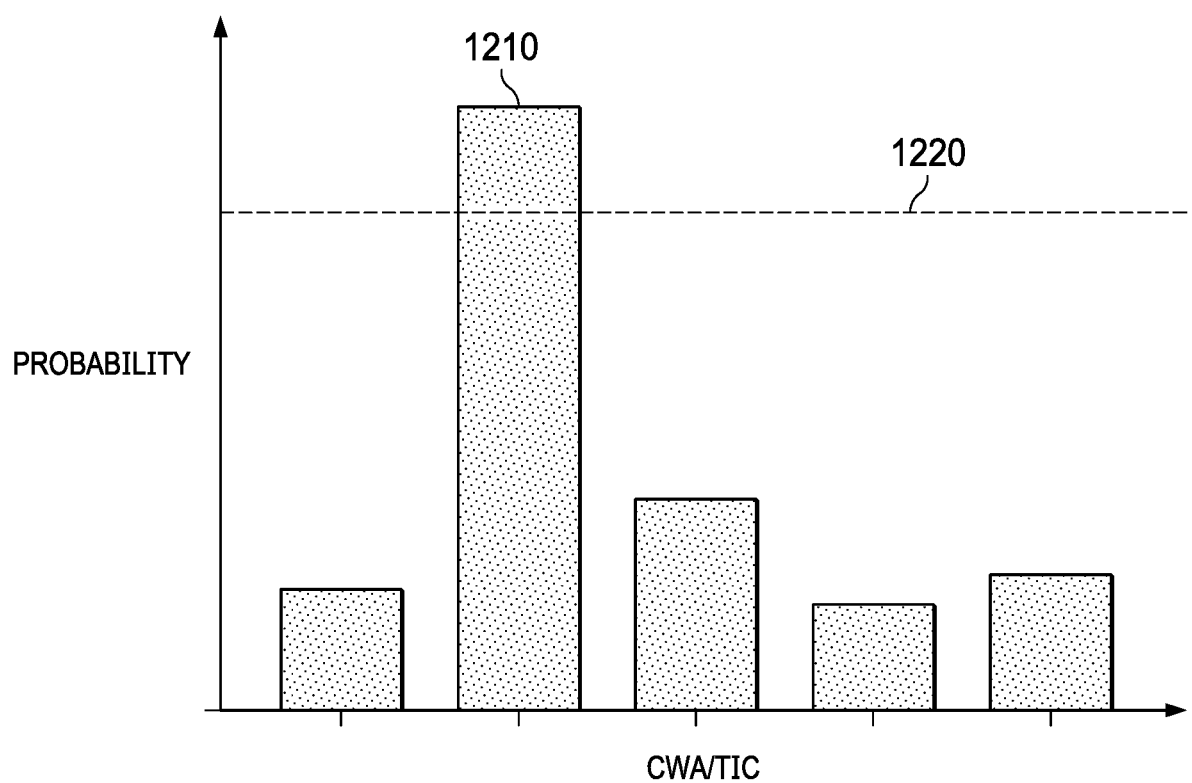

Turning now to FIGS. 11 to 12, illustrated are diagrams showing, respectively, absorption and probability diagrams that support a method for detecting or identifying a substance. The methods are illustrated and described hereinbelow with reference to the flow diagrams of FIGS. 24 and 25. FIG. 11 illustrates absorption at different wavelengths. For example, an absorption 1110 may be at an initial wavelength as described with respect to the methods herein and an absorption 1120 may be at a subsequent selected wavelength.

FIG. 12 illustrates computed probabilities of five candidate types of target analytes such as a chemical warfare agent ("CWA") or a toxic industrial chemical target ("TIC") computed with the methods as described herein. A second target analyte 1210 is shown with a probability greater than a probability threshold 1220. In this case, the probability of the second target analyte 1210 is sufficiently high to enable the methods to declare identification of the second target analyte 1210. The other probabilities of the other four target analytes are below the probability threshold 1220, and in these cases the probability is not sufficiently high to declare identification of these target analytes.

Figure 13:
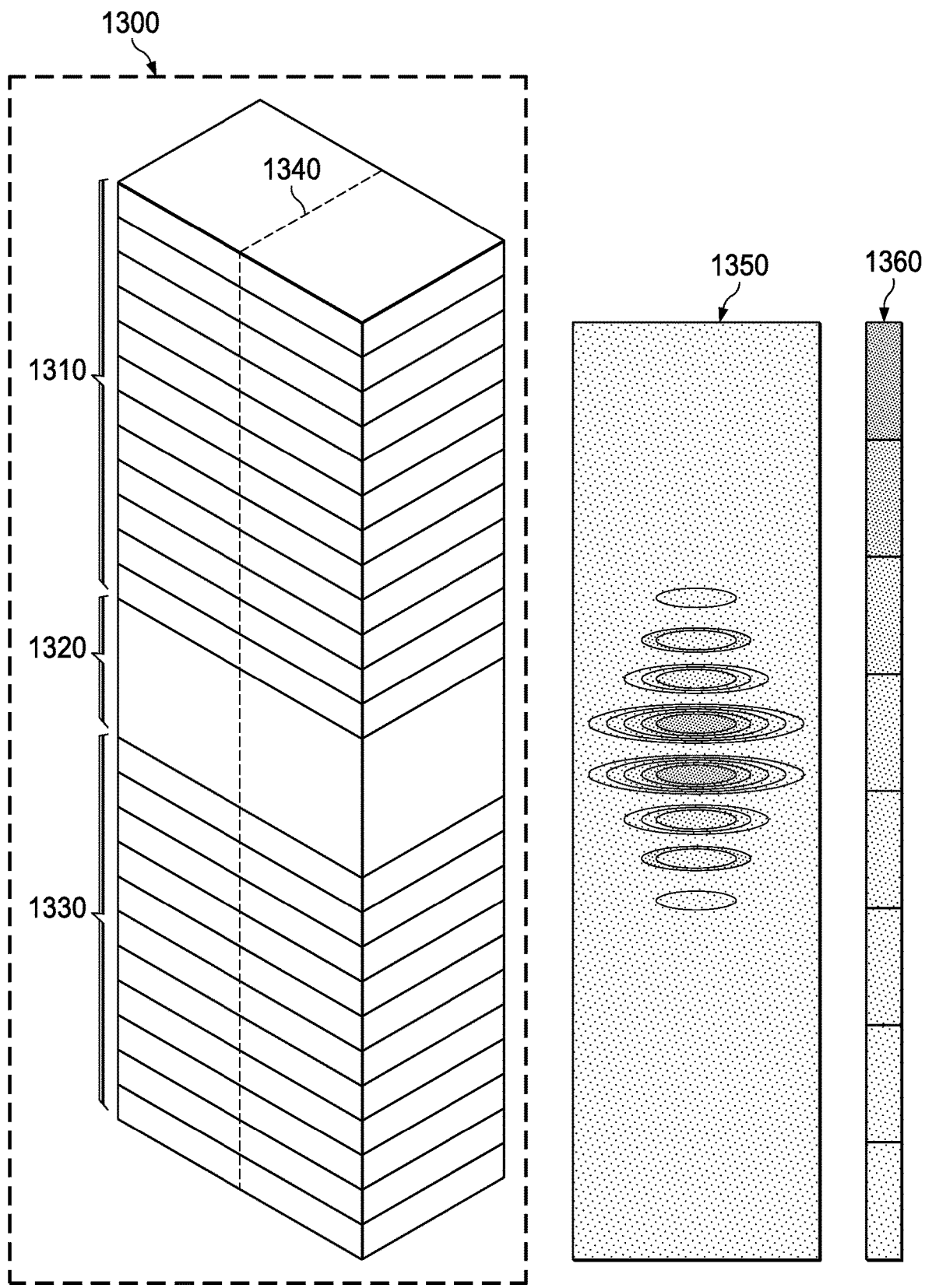
FIG. 13 illustrates a perspective view of an embodiment of a tunable resonator demonstrating an optic intensity thereof.

Turning now to FIG. 13, illustrated is a perspective view of an embodiment of a tunable resonator 1300 demonstrating an optic intensity 1350 thereof. The tunable resonator 1300 includes an upper Bragg reflector 1310 and a lower Bragg reflector 1330 separated by a porous matrix 1320. A cross-sectional plane 1340 cuts centrally across the tunable resonator 1300. A light source such as a MIR light source illuminates the top of the tunable resonator 1300. The tunable resonator 1300 demonstrates the optical intensities 1350 across the cross sectional plane 1340 according to an optical intensity scale 1360, with higher optical intensities indicated at the top of the scale and lower optical intensities indicated at the bottom of the scale. As illustrated by the optical intensities 1350, a high photonic level is created in the region of a cavity with the porous matrix 1320 wherein an unknown substance is absorbed. As described herein, the wavelength of the light in the cavity (for the porous matrix 1320) is tunable. Accordingly, resonance of the tunable resonator 1300 enhances photonic intensity in the region occupied by the unknown substance at the selected wavelength.

Figure 14:
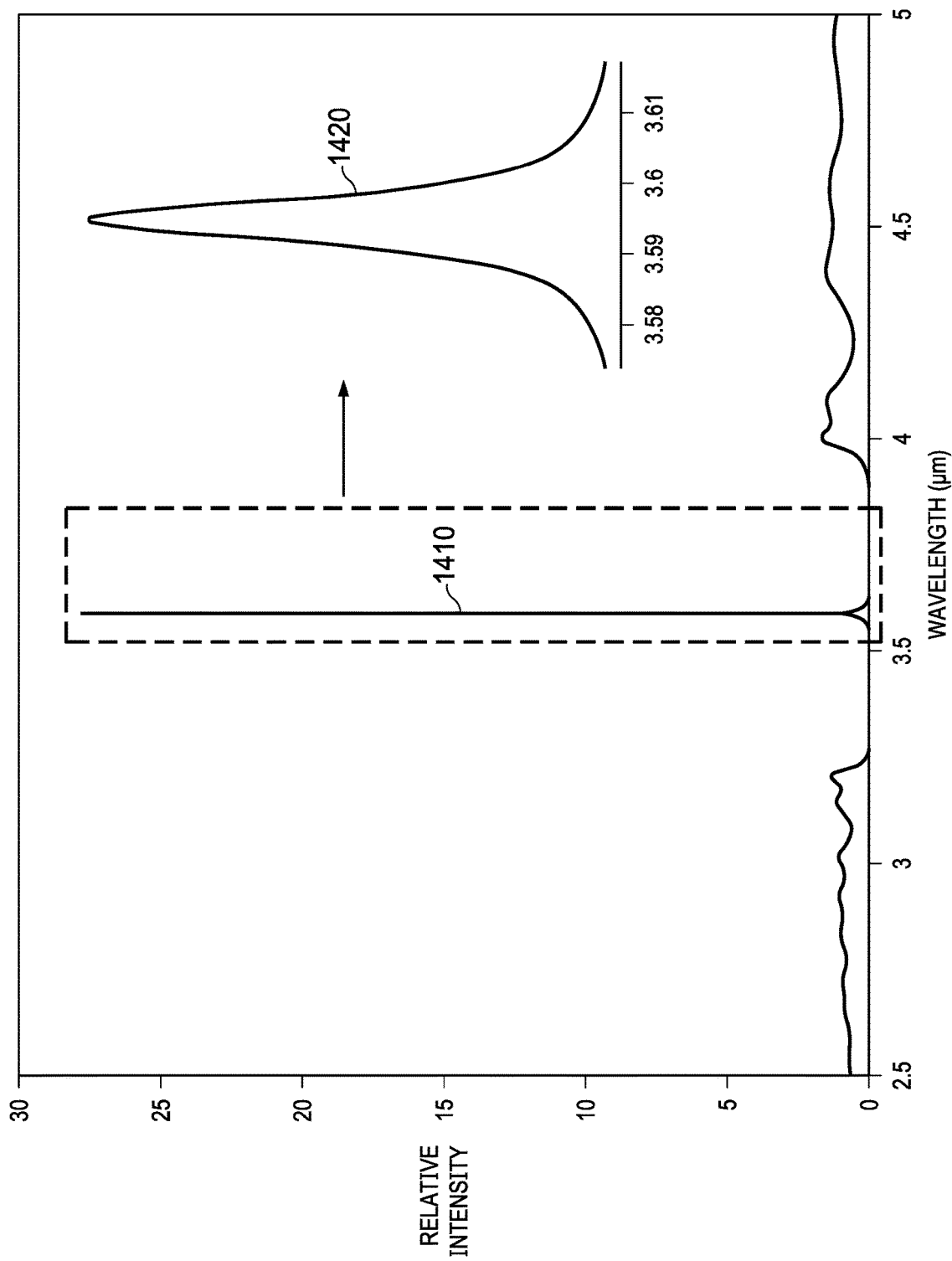
FIG. 14 illustrates a waveform diagram of a relative intensity verses wavelength for Fabry-Perot resonances.

Turning now to FIG. 14, illustrated is a waveform diagram of relative intensity verses wavelength for Fabry-Perot resonances. An absorption peak 1410 is illustrated at a wavelength $\lambda$ of 3.59 micrometers ("$\mu m$"). A Fabry-Perot resonance peak 1420 of a tunable resonator enables identification of the wavelength $\lambda$ for the absorption peak 1410. An identification of a Fabry-Perot resonance matched to a characteristic absorption wavelength $\lambda$ enhances detection and identification sensitivity of a tunable resonator for an unknown substance or target analyte.

Figure 15:
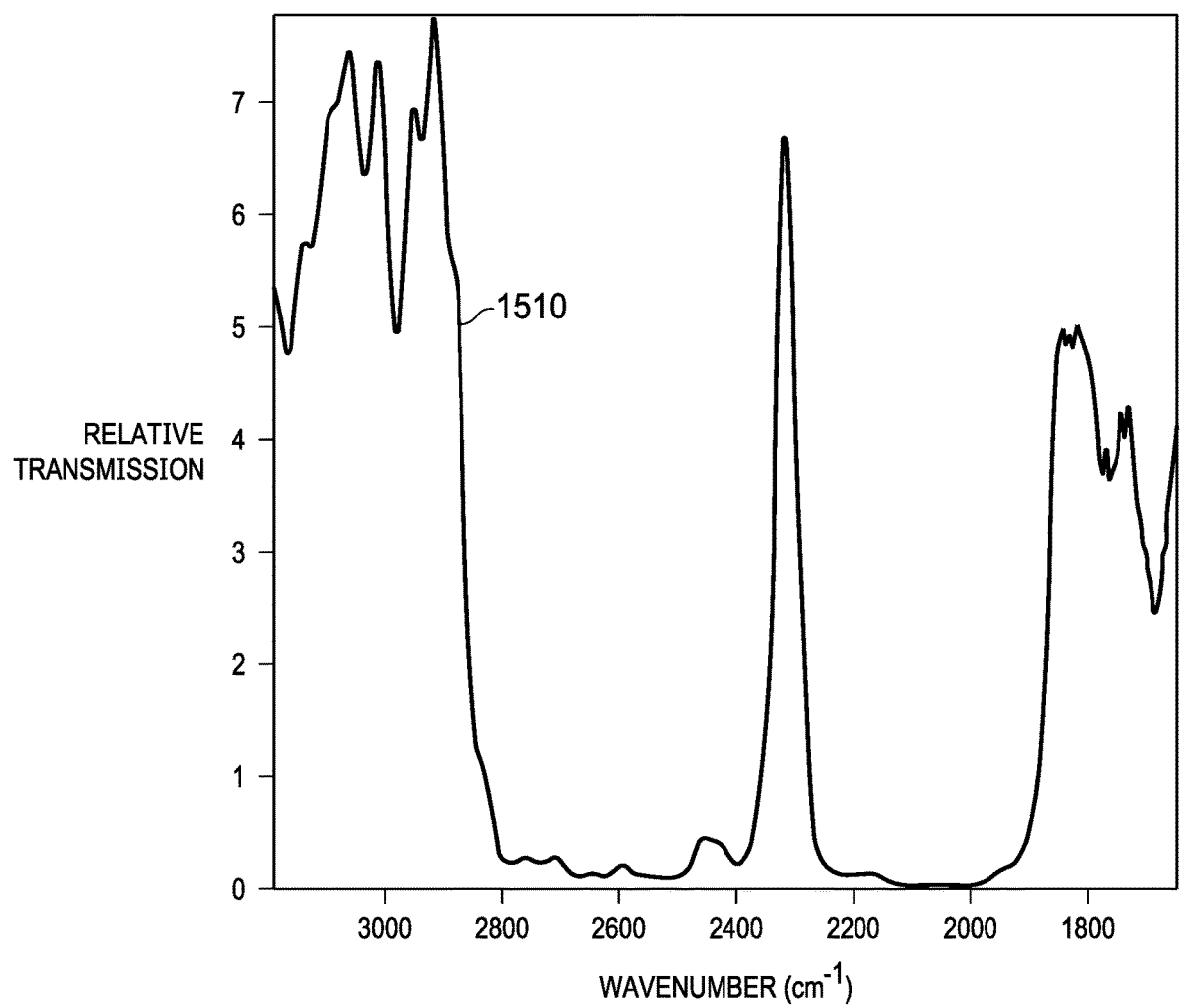
FIG. 15 illustrates a waveform diagram of transmission spectrum associated with an apparatus for detecting a substance.

Turning now to FIG. 15, illustrated is a waveform diagram of transmission spectrum associated with an apparatus for detecting a substance. The curve 1510 demonstrates a relative transmission spectrum verses wavenumber (in $cm^{-1}$) for an apparatus including an upper Bragg reflector and a lower Bragg reflector separated by a porous matrix. The apparatus includes a detector positioned proximate the resonator and configured to provide an absorption signal representing a spectral optical response. The apparatus is illuminated by a MIR light source and produces a first spectral optical response from an analyte absorbed within the porous matrix. The apparatus is formed, similar to that illustrated in and described hereinabove with reference to FIGS. 2 and 3, with a tunable resonator wherein an angle of incidence of light produced by the MIR light source is altered relative to the upper Bragg reflector and the lower Bragg reflector. The curve 1510 showing relative transmission of the analyte absorbed in the porous matrix shows a strong resonance at around 2300 $cm^{-1}$.

Figure 16:
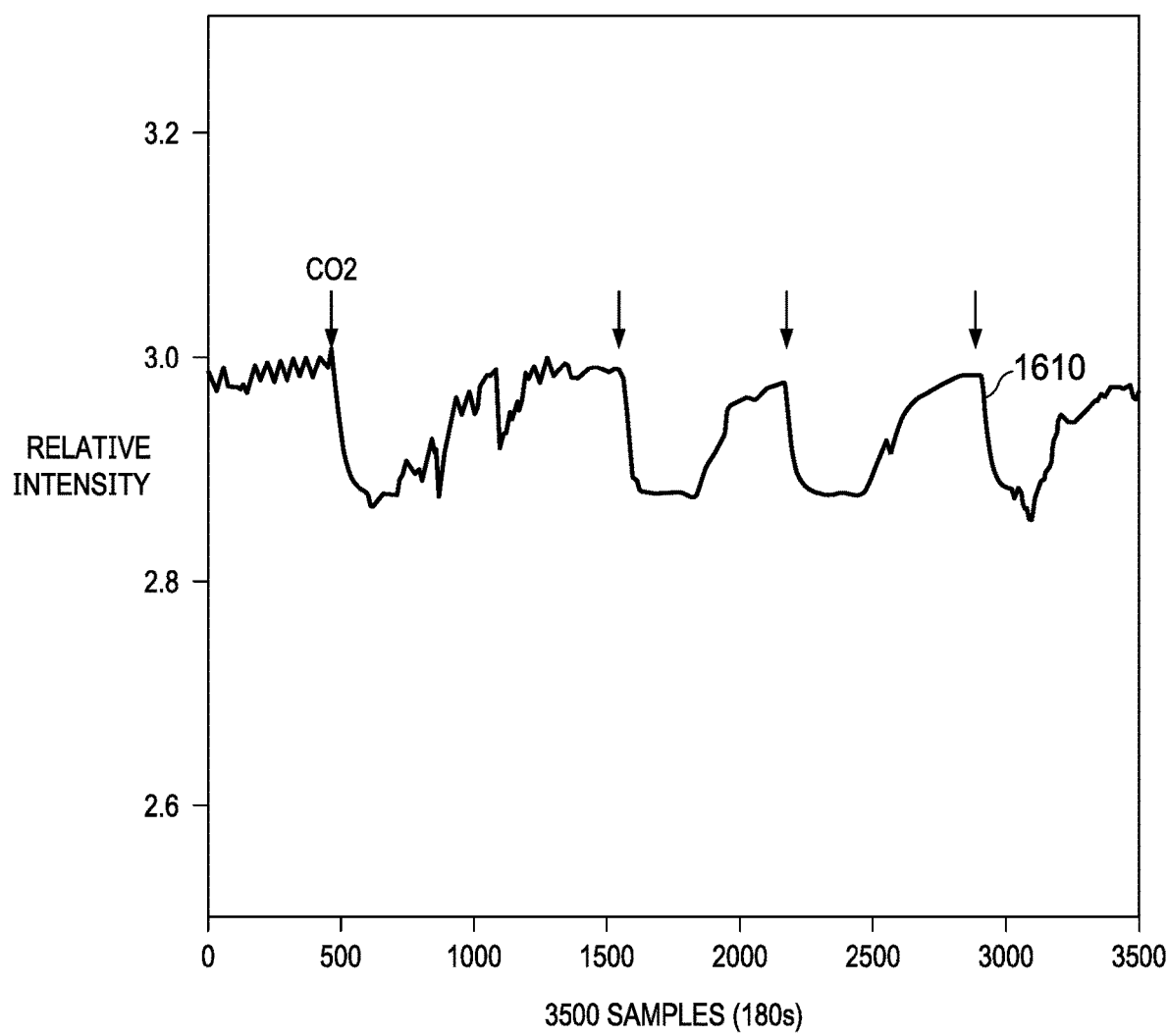
FIG. 16 illustrates a waveform diagram of relative intensity associated with an apparatus for detecting a substance.

Turning now to FIG. 16, illustrated is a waveform diagram of relative intensity associated with an apparatus for detecting a substance. The curve 1610 demonstrates a relative intensity for 3500 samples taken over 180 seconds ("s") for an apparatus including an upper Bragg reflector and a lower Bragg reflector separated by a cavity when exposed to carbon dioxide ("$CO_2$") as the analyte. Each vertical arrow in the FIGURE denotes the start of a pulse of carbon dioxide. In this case, the apparatus was tuned to a wavelength of 4.3 micrometer ("$\mu m$"), at which the optical wavelength the carbon dioxide has strong absorption of photonic radiation.

Figure 17:
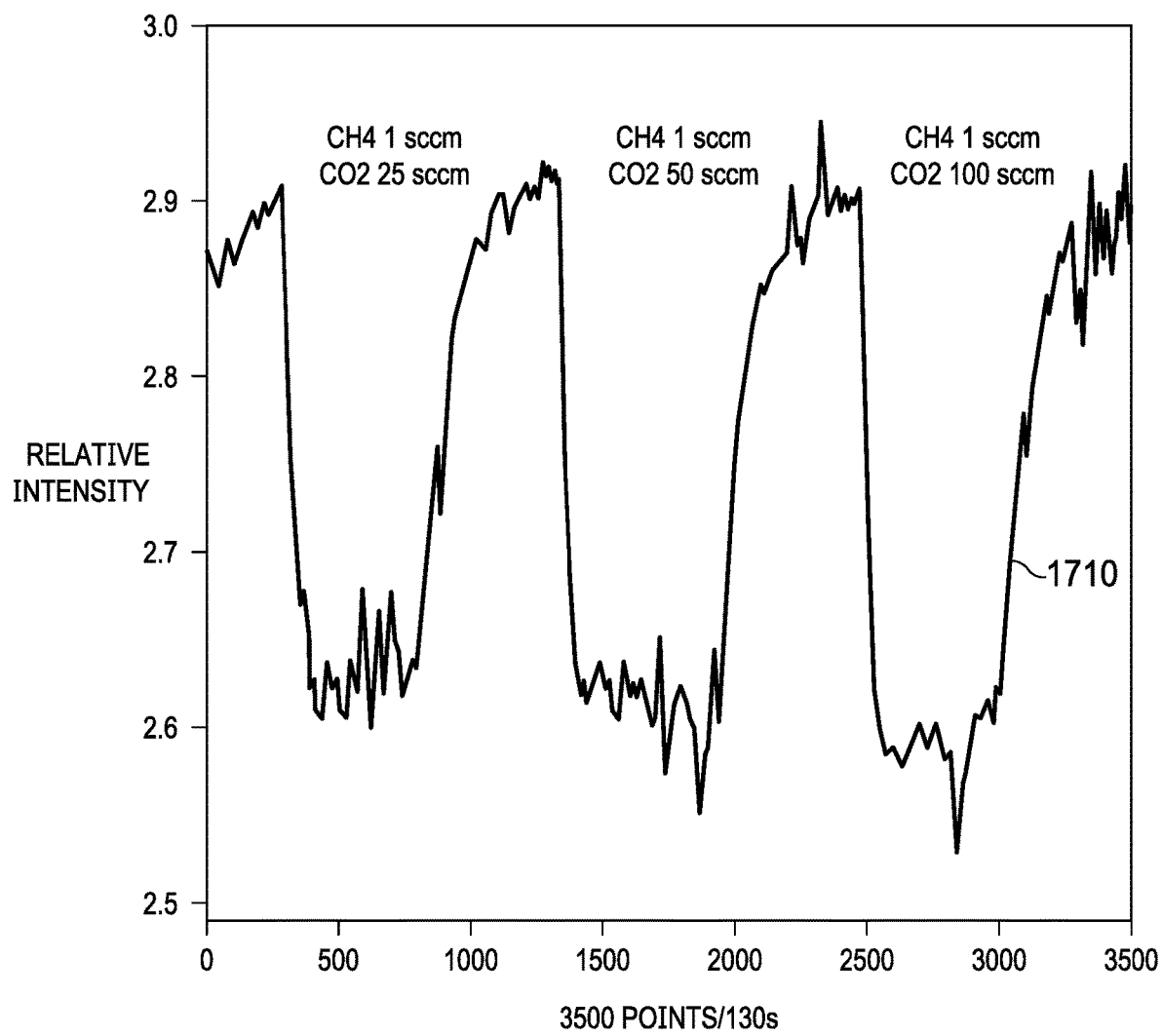
FIG. 17 illustrates a waveform diagram of relative intensity associated with an apparatus for detecting a substance.

Turning now to FIG. 17, illustrated is a waveform diagram of relative intensity associated with an apparatus for detecting a substance. The curve 1710 demonstrates a relative intensity for 3500 samples taken over 130 seconds ("s") for an apparatus including an upper Bragg reflector and a lower Bragg reflector separated by a cavity when exposed to an analyte mixture of carbon dioxide ("$CO_2$") and methane ("$CH_4$") with an increasing flow rate of carbon dioxide. In this case, the apparatus was tuned to a particular optical wavelength of 3.3 μm, at which the optical wavelength carbon dioxide has negligible absorption of photonic radiation. As a result, fluctuations in carbon dioxide flow rate have negligible effect on the sensor response, which otherwise remains highly sensitive to the methane. This FIGURE shows the apparatus is tunable for a particular analyte.

Figure 18:
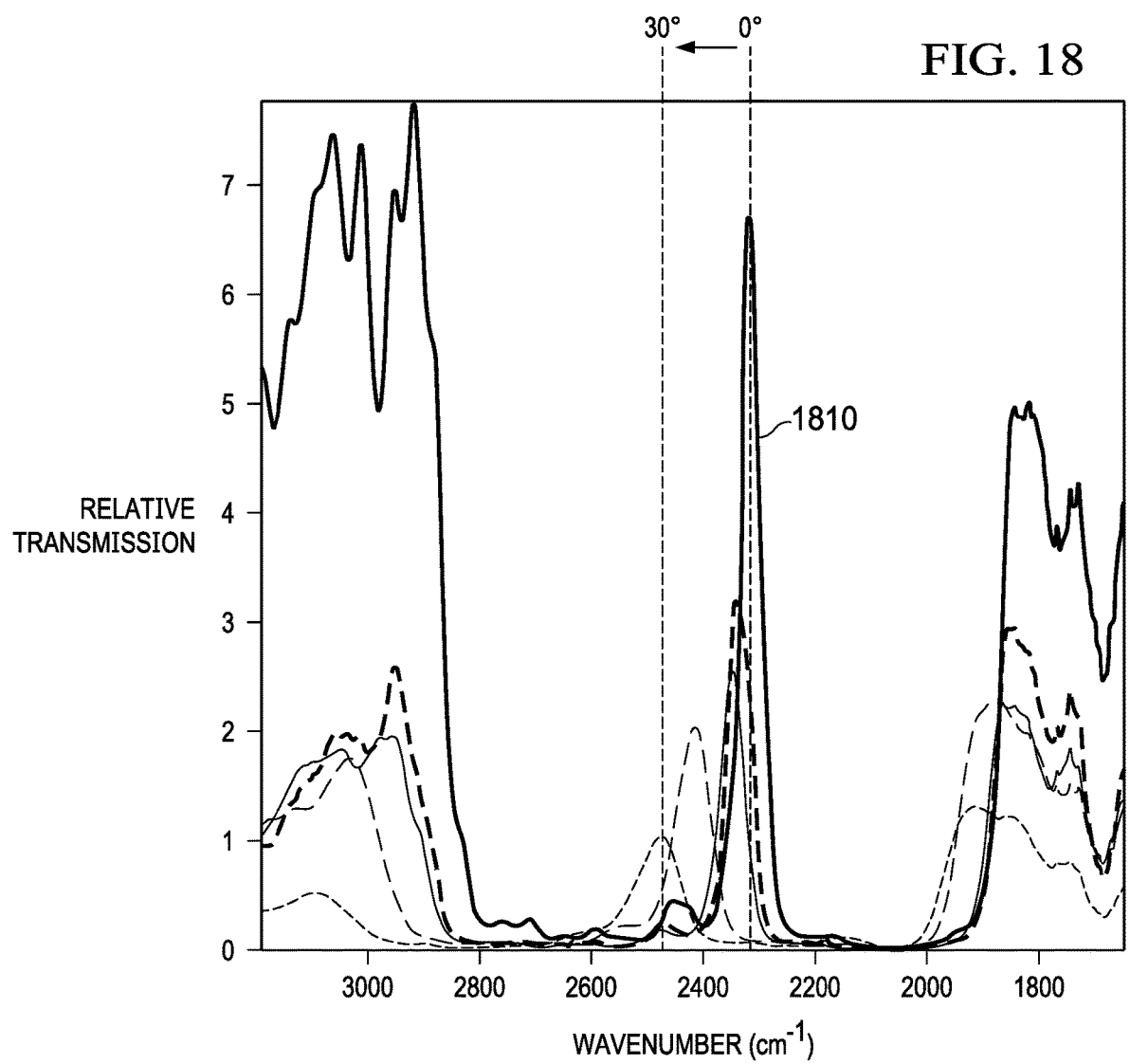
FIG. 18 illustrates a waveform diagram of transmission spectrum associated with an apparatus for detecting a substance.

Turning now to FIG. 18, illustrated is a waveform diagram of transmission spectrum associated with an apparatus for detecting a substance. The graphical representations demonstrate a relative transmission spectrum verses wavenumber (in $cm^{-1}$) for an apparatus including an upper Bragg reflector and a lower Bragg reflector separated by a porous matrix. The graphical representations illustrate how the cavity (accommodating the porous matrix) illustrated and describe hereinabove with reference to FIG. 2 can be tuned to different resonant frequencies. As illustrated in FIG. 18, the angle of incidence of light produced by the MIR light source relative to the upper Bragg reflector and the lower Bragg reflector was altered from 0 degrees ("0°") to 30°. What is illustrated in FIG. 18 is that by applying a rotation of the light beam relative to the principal axis of the DBR, the resonant frequency can be shifted toward the left, i.e., toward a larger wavenumber. The curve 1810 in FIG. 18 is the same as the curve 1510 in FIG. 15.

Figure 19:
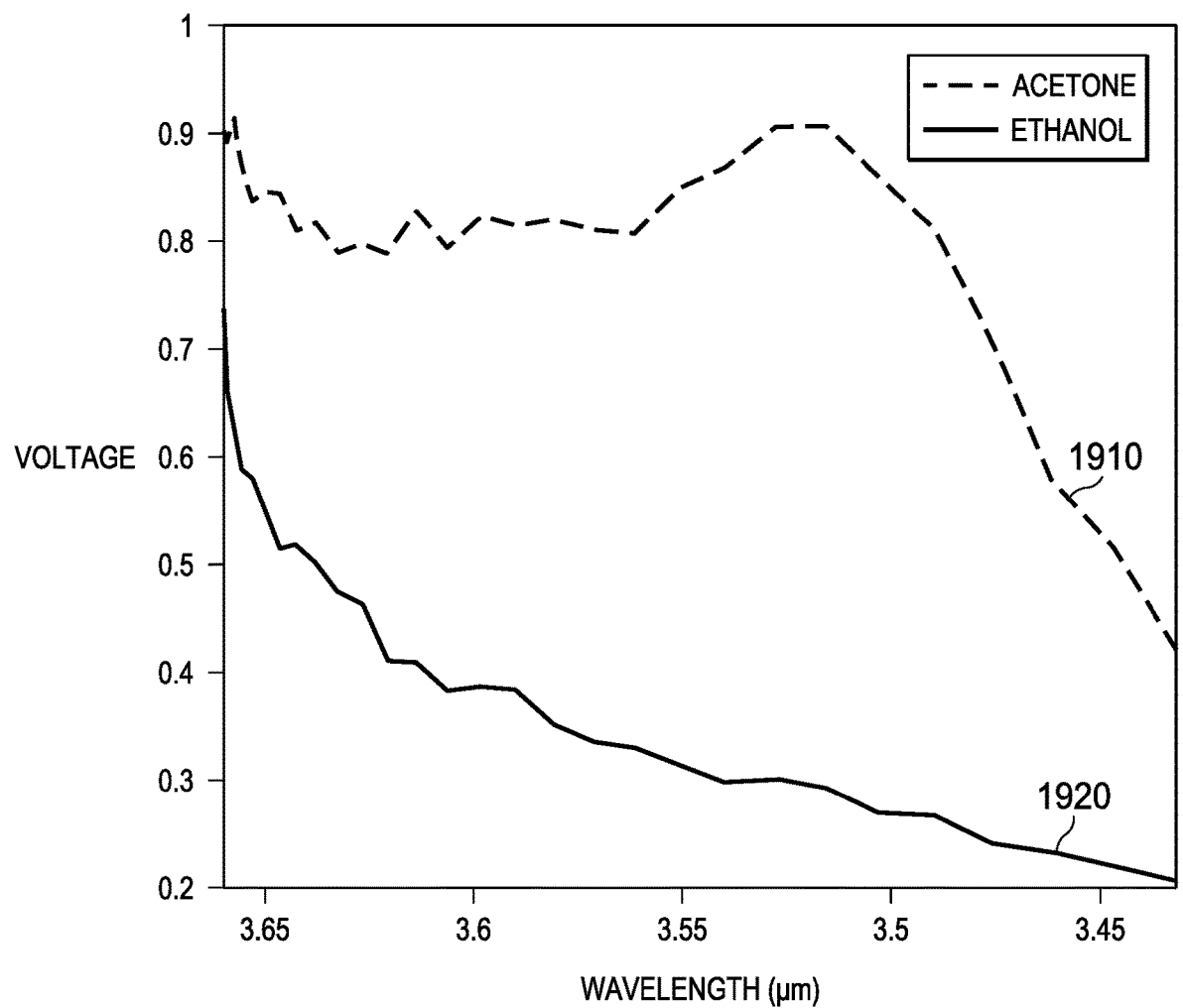
FIG. 19 illustrates a waveform diagram of spectral responses associated with an apparatus for detecting a substance.

Turning now to FIG. 19, illustrated is a waveform diagram of spectral responses associated with an apparatus for detecting a substance. The graphical representations demonstrate the spectral responses of acetone (curve 1910) and ethanol (curve 1920) for an apparatus including an upper Bragg reflector and a lower Bragg reflector separated by a cavity plotted as voltage verses wavelength (micrometers ("μm")). Each of these two analytes is a breath marker of general interest. A control signal is configured to perform a frequency sweep (from right to left). As shown in the FIGURE, the two chemicals have unique spectral responses, which make their identification possible employing the apparatus introduced herein.

Figure 20:
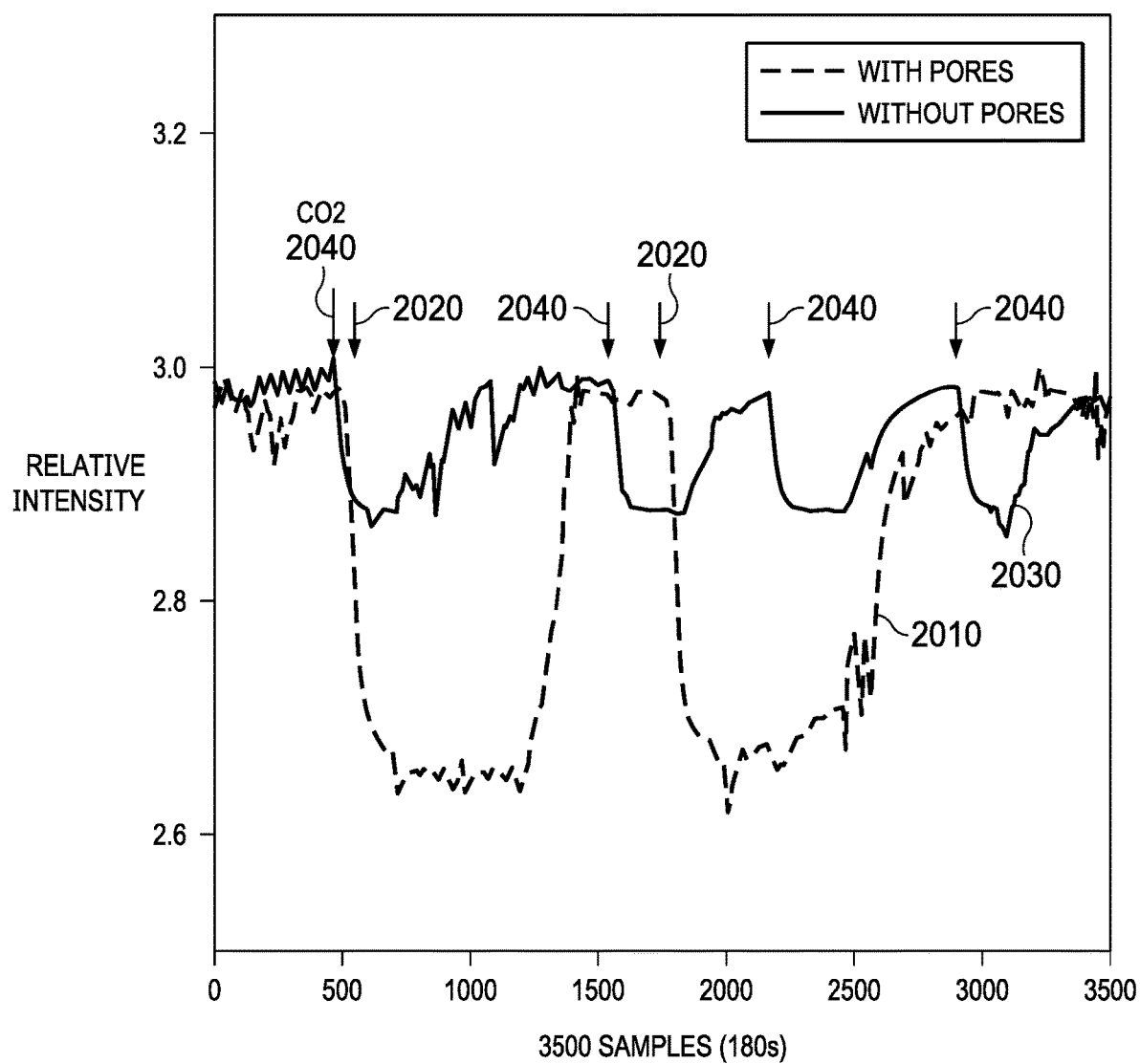
FIG. 20 illustrates a waveform diagram of relative intensity associated with an apparatus for detecting a substance.

Turning now to FIG. 20, illustrated is a waveform diagram of relative intensity associated with an apparatus for detecting a substance. The curves 2010, 2030 demonstrate a relative intensity for 3500 samples taken over 180 seconds ("s") for an apparatus including an upper Bragg reflector and a lower Bragg reflector separated by a cavity having a matrix with and without pores (or sorbent material), respectively, when exposed to carbon dioxide ("$CO_2$") as the analyte. Each vertical arrow (designated 2020) in the FIGURE denotes the start of a pulse of carbon dioxide for the matrix with pores. Each vertical arrow (designated 2040) in the FIGURE denotes the start of a pulse of carbon dioxide for the matrix without pores. As shown, the sorbent material significantly enhances the sensitivity of the apparatus. The curve 2030 in FIG. 20 is the same as the curve 1610 in FIG. 16.

Figure 21:
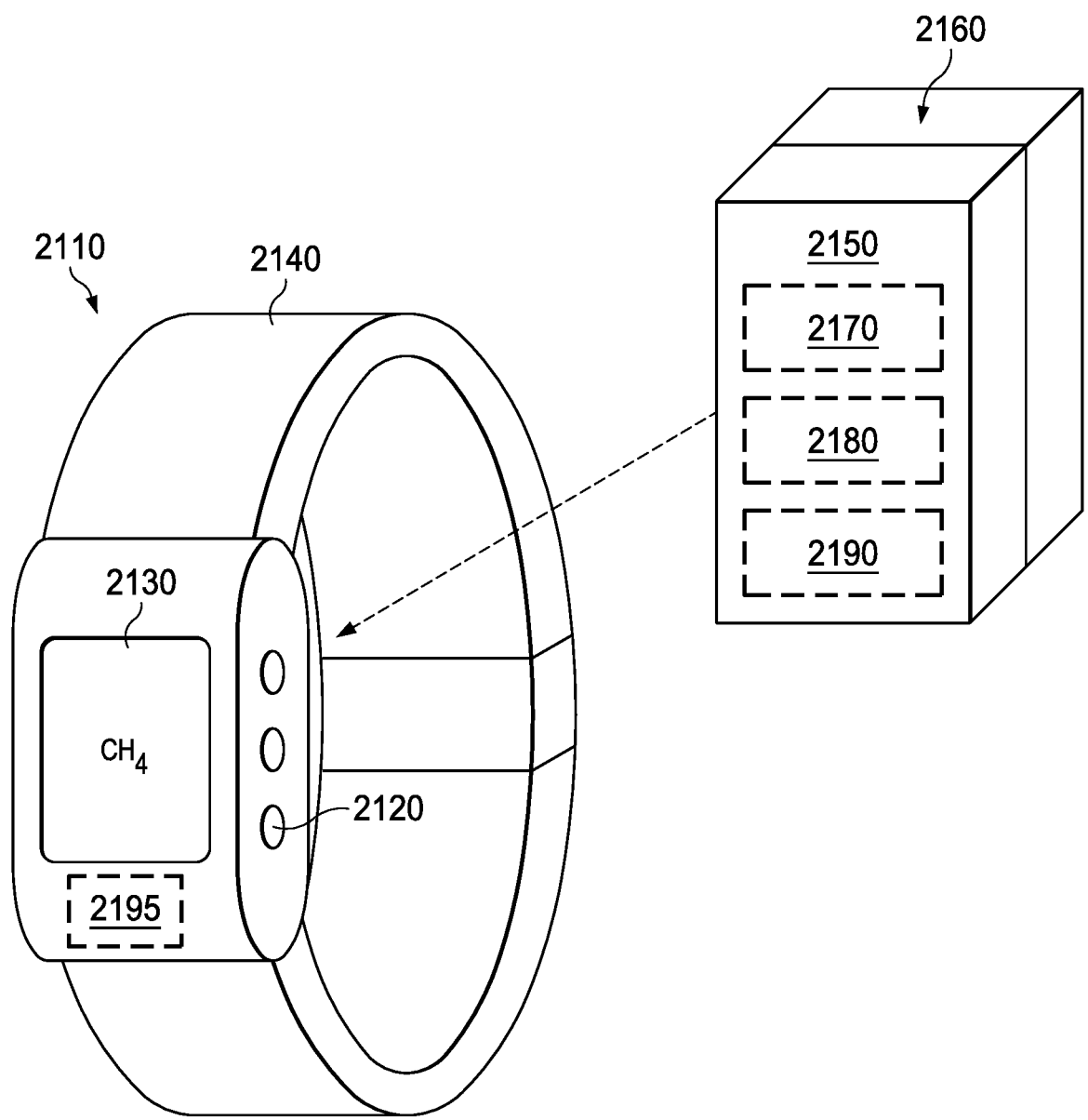
FIG. 21 illustrates a perspective view of an embodiment of a wearable chemical sensor.

Turning now to FIG. 21, illustrated is a perspective view of an embodiment of a wearable chemical sensor 2110. The wearable chemical sensor 2110 includes control buttons (one of which is designated 2120), a display 2130 and a band 2140 for displaying an identified substance. The control buttons 2120 and display 2130 provide a human machine interface for the wearable chemical sensor 2110. The band 2140 secures the wearable chemical sensor 2110 to a person's wrist. The wearable chemical sensor 2110 also includes an apparatus 2150 for detecting a substance. The apparatus 2150 includes at least a tunable resonator 2160, a detector 2170, a controller 2180 and an electromechanical device 2190. For a better understanding of the apparatus 2150, see the description of the apparatus for detecting a substance with respect to FIGS. 1 to 4 above. In the illustrated embodiment, the apparatus 2150 identifies methane ("$CH_4$"), which is presented on the display 2130 of the wearable chemical sensor 2110. A power source 2195 such as a battery or solar cell provides power for the apparatus 2150 and, in general, for the wearable chemical sensor 2110.

Figure 22:
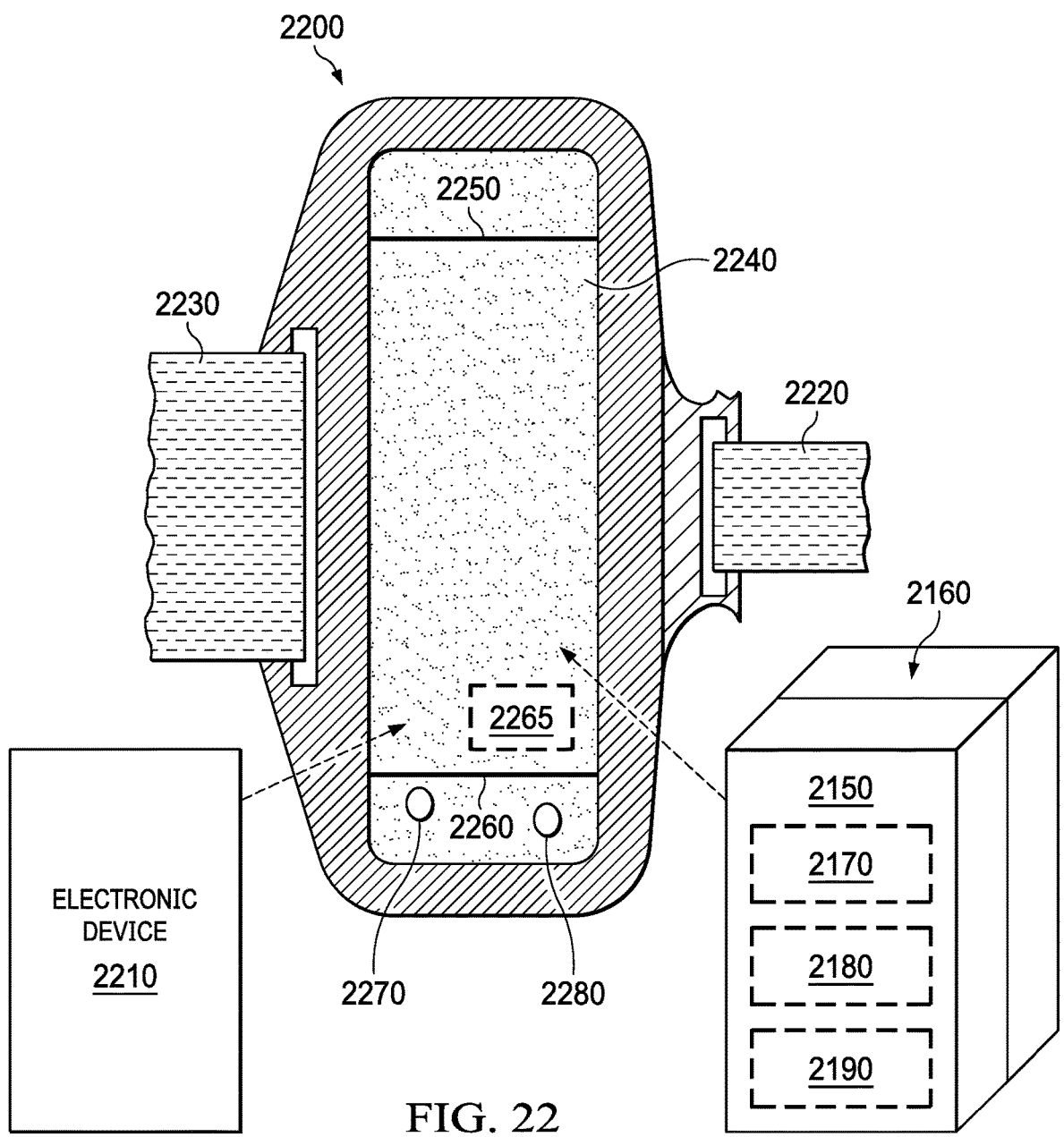
FIG. 22 illustrates a rear view of an embodiment of a retaining device for the apparatus for detecting a substance.

Turning now to FIG. 22, illustrated is a rear view of an embodiment of a retaining device 2200 for the apparatus 2150 for detecting a substance. The retaining device 2200 includes bands 2220, 2230 operable to be attached to an extremity (e.g., an arm, leg, or wrist) of a person. The retaining device 2200 includes a cavity 2240 with elastic cords 2250, 2260 that provide a retention mechanism for an electronic device 2210 (e.g., an electronic watch, a multimedia player, a personal fitness sensor, and a medical monitor) and the apparatus 2150. The retaining device 2200 is configured to be worn about an extremity of a person and may provide electrical power via a power source 2265 for the electronic device 2210 and the apparatus 2150 that is removably coupled (in this case inserted) into the cavity 2240. The retaining device 2200 also includes electrical contacts 2270, 2280 to provide an electrical connection for the electronic device 2210 and/or the apparatus 2150.

Figure 23:
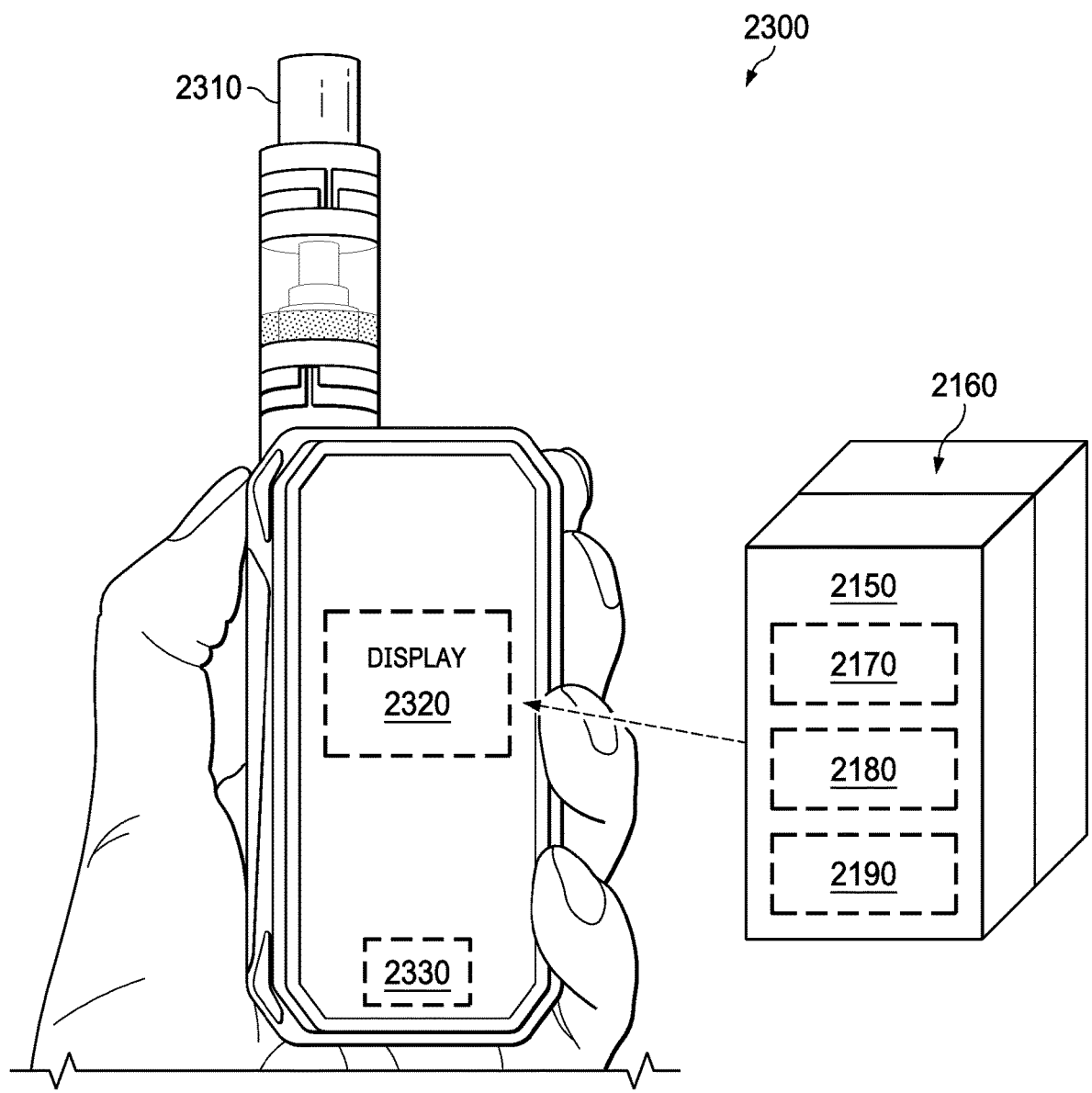
FIG. 23 illustrates a side view of an embodiment of a handheld unit for the apparatus for detecting a substance.

Turning now to FIG. 23, illustrated is a side view of an embodiment of a handheld unit 2300 for the apparatus 2150 for detecting a substance. The handheld unit 2300 may be employed to measure analytes such as alcohol, cannabis, or other recreational drug-related products by a person blowing into a nozzle 2310 at the top. A disposable cover for the nozzle 2310 may be provided so that the handheld unit 2300 is safely used for a number of people. The measurement result can be viewed on a display 2320 of the handheld unit 2300. The handheld unit 2300 may be used to detect and measure an analyte such as acetone that is an indicator of blood glucose levels. Blood glucose levels are continually monitored by a diabetic person that now relies on the inconvenient process of pricking one's skin and drawing blood to assess a personal blood glucose level. The handheld unit 2300 may provide electrical power via a power source 2330 for the handheld unit 2300 and the apparatus 2150.

Figure 24:
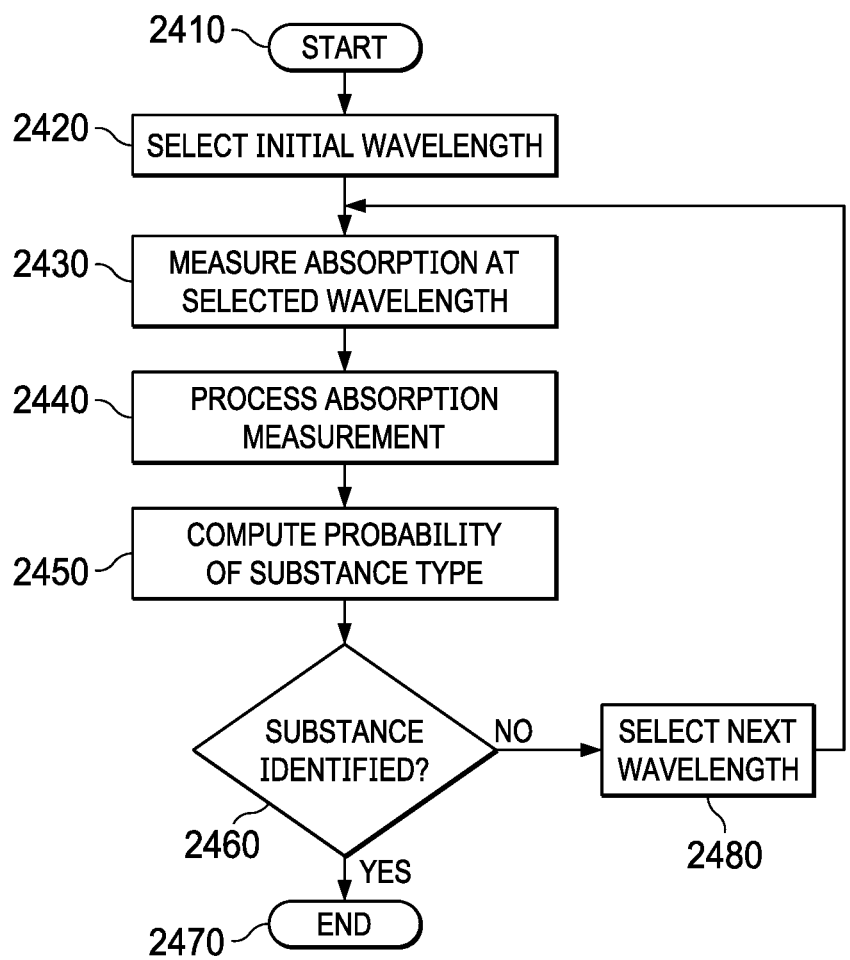
FIGS. 24 and 25 illustrate flow diagrams of a method for identifying a substance, in accordance with an embodiment.

Turning now to FIG. 24, illustrated is a flow diagram of a method for identifying a substance, in accordance with an embodiment. The method illustrates an active-sensing procedure that selects wavelengths in real time to reduce power consumption and false positives, while identifying a substance such as a target analyte absorbed in a porous matrix in a tunable resonator. The method begins at a start step or module 2410 followed by selecting an initial wavelength to produce a spectral optical response from the target analyte to determine an absorption characteristic thereof at a step or module 2420. The initial wavelength may be a predetermined wavelength. At step or module 2430, the absorption of the spectrum of the target analyte is measured at the selected wavelength. For example, as illustrated in FIG. 11, an absorption 1110 at an initial wavelength is illustrated. At step or module 2440, the absorption measurement is processed. At step or module 2450, the probability of a type of the target analyte is computed employing the absorption measurement. At a decisional step or module 2460, if sufficient absorption data has been obtained for the target analyte (e.g., if the probability of the type of the substance computed in step or module 2450 is sufficiently high such as above a probability threshold level), the method ends at a step or module 2470. Otherwise, a next wavelength to sense absorption of the spectrum of the target analyte is selected at a step or module 2480. The selection of the next wavelength may depend on the measured absorption. The method then continues to the step or module 2430, wherein the absorption of the spectrum of the target analyte is measured at the currently selected wavelength. For example, as illustrated in FIG. 11, an absorption 1120 at a currently selected wavelength is illustrated. Of course, a plurality of target analytes can be identified with the method described herein. The method may also terminate after a number of selections of next wavelength if the target analyte is not identified.

Figure 25:
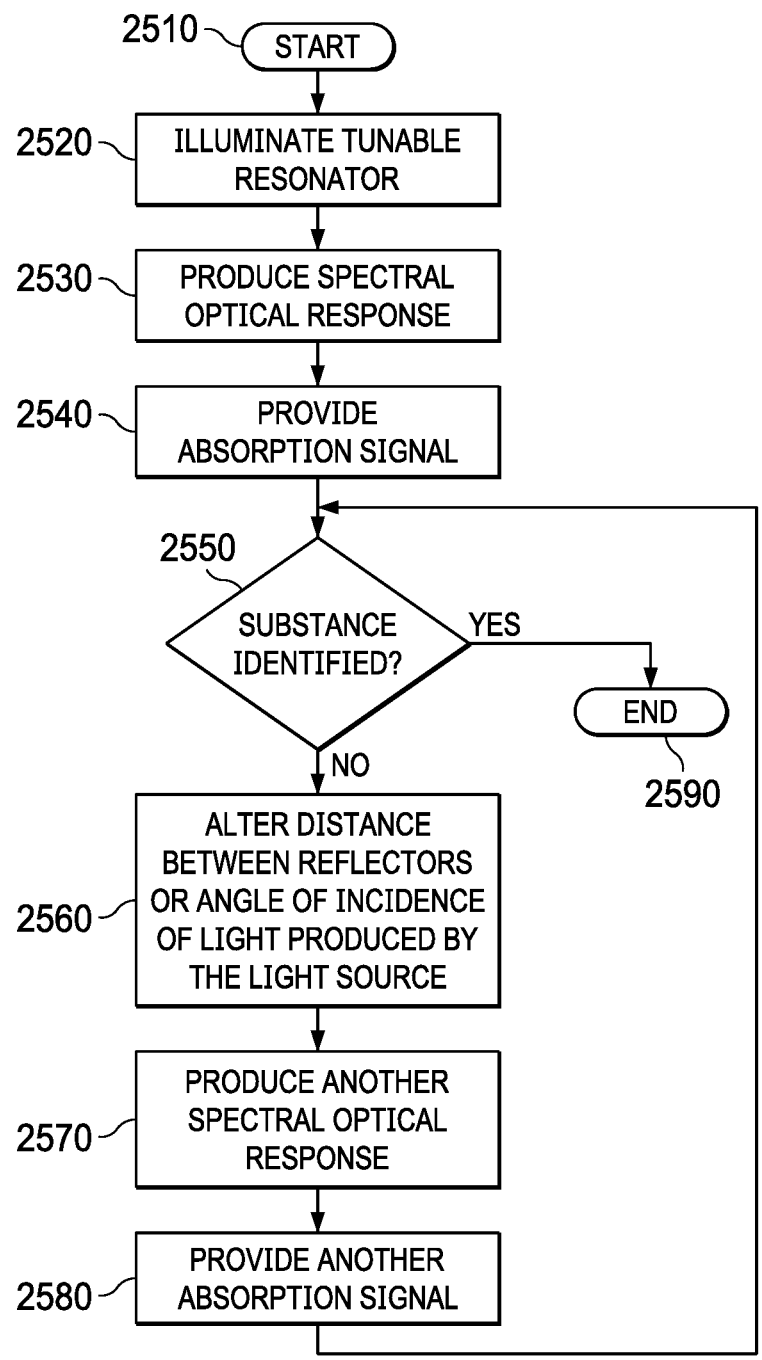

Turning now to FIG. 25, illustrated is a flow diagram of an embodiment of a method for detecting a substance. The method begins at a start step or module 2510. At a step or module 2520, the method includes illuminating a tunable resonator including an upper Bragg reflector and a lower Bragg reflector separated by a porous matrix by a light source via, for instance, an optical channel. The upper Bragg reflector and the lower Bragg reflector may include multiple layers, for example, without limitation, alternating layers of silicon nitride and silicon dioxide. The porous matrix may include, without limitation, a porous oxide and metallic nanoparticles, a polymer matrix and metallic nanoparticles and a zeolite. The method may be embodied in an apparatus attached to an extremity of a person, or in a handheld unit.

At a step or module 2530, the method includes producing a spectral optical response from a substance absorbed within the porous matrix. Thereafter, the method includes providing an absorption signal representing the spectral optical response at a step or module 2540. In a decisional step or module 2550, the method determines if a substance (or type of substance) has been identified from one or more absorption signals. Identifying the absorption signal may include identifying a concentration of the substance and/or a number of distinct substances. If a type of substance has been identified, then the method ends in a step or module 2590. The type of substance may be identified by estimating a probability from one or more absorption signals of the type of the substance above, for instance, a probability threshold.

If the type of substance has not been identified, then the method alters a distance between the upper Bragg reflector and the lower Bragg reflector in response to the absorption signal, or an angle of incidence of light produced by the light source relative to the upper Bragg reflector and the lower Bragg reflector via, for instance, an electromechanical device, in a step or module 2560. By altering the distance between the upper Bragg reflector and the lower Bragg reflector or the angle of incidence of the light produced by the light source, the tunable resonator is tuned to, for instance, a different wavelength. At a step or module 2570, the method includes producing another spectral optical response from the substance absorbed within the porous matrix. Thereafter, the method includes providing another absorption signal representing the another spectral optical response by, for instance, selecting a control signal for the electromechanical device to alter the distance or angle of incidence of light at a step or module 2580.

Returning to the decisional step or module 2550, the method determines if the substance (or type of substance) has been identified from the absorption signals. If the type of substance has been identified, then the method ends in the step or module 2590. Again, the type of substance may be identified by estimating a probability of the type of the substance above, for instance, a probability threshold. If the type of substance has not been identified, the method returns to the step or module 2560 to further tune the tunable resonator and obtain yet another absorption signal in an attempt to identify the type of substance or at least a very high probability thereof.

Thus, as introduced herein an apparatus is configured to identify an unknown analyte, a concentration of the analyte, and/or a number of distinct substances, employing an infrared light source. The apparatus is formed with a tunable resonator including an upper Bragg reflector and a lower Bragg reflector separated by a cavity including a porous matrix. The upper Bragg reflector is configured to be illuminated by the light source. The apparatus includes a detector positioned proximate the resonator configured to provide a first absorption signal representing the first spectral optical response. The apparatus produces a first spectral optical response from a substance absorbed within the porous matrix.

In an embodiment, the apparatus further includes an electromechanical device configured to alter a distance between the upper Bragg reflector and the lower Bragg reflector in response to the first absorption signal representing the first spectral optical response to tune the tunable resonator. In an embodiment, the electromechanical device is configured to alter an angle of incidence of light produced by the light source relative to the upper Bragg reflector and the lower Bragg reflector in response to the first absorption signal representing the first spectral optical response to tune the tunable resonator.

In an embodiment, the apparatus further includes a controller configured to provide a control signal to the electromechanical device to alter the distance between the upper Bragg reflector and the lower Bragg reflector, or alter the angle of incidence of the light produced by the light source. The controller is configured to select the control signal to enable the detector to provide a second absorption signal representing a second spectral optical response from the substance. The controller is configured to identify a type of the substance, a concentration of the substance or a number of distinct substances from the first absorption signal and the second absorption signal. The controller is further configured to estimate a probability of a type of the substance from the first absorption signal and the second absorption signal. In an embodiment, the upper Bragg reflector and the lower Bragg reflector include multiple layers. The porous matrix is selected from the group consisting of, without limitation, a porous oxide and metallic nanoparticles, a polymer matrix and metallic nanoparticles, and a zeolite. In an embodiment, the apparatus is coupled to a band configured to attach the apparatus to an extremity of a person or configured as a part of a handheld unit. In an embodiment, the light source is configured to illuminate the upper Bragg reflector through an optical channel.

Those skilled in the art should understand that the previously described embodiments of a monitor or chemical sensor and related methods of operating and forming the same are submitted for illustrative purposes only. While the monitor formed with a tunable resonator has been described in the environment of a wearable chemical sensor, the monitor may also be applied in other environments such as, without limitation, a stationary, mobile, or laboratory environment.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiment can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof. Also, many of the features, functions, and steps of operating the same may be reordered, omitted, added, etc., and still fall within the broad scope of the various embodiments.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   a tunable resonator including an upper Bragg reflector and a lower Bragg reflector separated by a porous matrix including a sorbent material, said upper Bragg reflector configured to be illuminated by a light source such that light passes through said upper Bragg reflector, then through said porous matrix and exits said lower Bragg reflector to enable said tunable resonator to produce a first spectral optical response from a substance absorbed within said porous matrix; and
   a detector positioned on an opposing side of said tunable resonator from said light source configured to detect said light and provide a first absorption signal representing said first spectral optical response.

2. The apparatus as recited in claim 1 further comprising an electromechanical device configured to alter a distance between said upper Bragg reflector and said lower Bragg reflector, or alter an angle of incidence of said light produced by said light source relative to said upper Bragg reflector and said lower Bragg reflector in response to said first absorption signal representing said first spectral optical response to tune said tunable resonator.

3. The apparatus as recited in claim 2 further comprising a controller configured to provide a control signal to said electromechanical device to alter said distance between said upper Bragg reflector and said lower Bragg reflector, or alter said angle of incidence of said light produced by said light source.

4. The apparatus as recited in claim 3 wherein said controller is configured to select said control signal to enable said detector to provide a second absorption signal representing a second spectral optical response from said substance.

5. The apparatus as recited in claim 4 wherein said controller is configured to identify a type of said substance, a concentration of said substance, or a number of distinct substances from said first absorption signal and said second absorption signal.

6. The apparatus as recited in claim 4 wherein said controller is configured to estimate a probability of a type of said substance from said first absorption signal and said second absorption signal.

7. The apparatus as recited in claim 1 wherein said upper Bragg reflector and said lower Bragg reflector comprise multiple layers.

8. The apparatus as recited in claim 1 wherein said porous matrix is selected from the group consisting of:
   a porous oxide and metallic nanoparticles,
   a polymer matrix and metallic nanoparticles, and
   a zeolite.

9. The apparatus as recited in claim 1 wherein said apparatus is coupled to a band configured to attach said apparatus to an extremity of a person, or configured as a part of a handheld unit.

10. The apparatus as recited in claim 1 wherein said light source is configured to illuminate said upper Bragg reflector through an optical channel.

11. A method, comprising:
    illuminating, by a light source, an upper Bragg reflector of a tunable resonator, said tunable resonator including said upper Bragg reflector and a lower Bragg reflector separated by a porous matrix including a sorbent material, light from said light source passing through said upper Bragg reflector, then through said porous matrix and exits said lower Bragg reflector;
    producing a first spectral optical response from a substance absorbed within said porous matrix; and
    providing a first absorption signal representing said first spectral optical response in accordance with detecting said light with a detector positioned on an opposing side of said tunable resonator from said light source.

12. The method as recited in claim 11 further comprising altering a distance between said upper Bragg reflector and said lower Bragg reflector, or altering an angle of incidence of said light produced by said light source relative to said upper Bragg reflector and said lower Bragg reflector in response to said first absorption signal representing said first spectral optical response to tune said tunable resonator.

13. The method as recited in claim 12 further comprising providing a control signal to an electromechanical device to alter said distance between said upper Bragg reflector and said lower Bragg reflector, or alter said angle of incidence of said light produced by said light source.

14. The method as recited in claim 13 further comprising selecting said control signal to enable providing a second absorption signal representing a second spectral optical response from said substance.

15. The method as recited in claim 14 further comprising identifying a type of said substance, a concentration of said substance, or a number of distinct substances from said first absorption signal and said second absorption signal.

16. The method as recited in claim 14 further comprising estimating a probability of a type of said substance from said first absorption signal and said second absorption signal.

17. The method as recited in claim 11 wherein said upper Bragg reflector and said lower Bragg reflector comprise multiple layers.

18. The method as recited in claim 11 wherein said porous matrix is selected from the group consisting of:
   a porous oxide and metallic nanoparticles,
   a polymer matrix and metallic nanoparticles, and
   a zeolite.

19. The method as recited in claim 11 further comprising attaching an apparatus embodying said method to an extremity of a person, or providing an apparatus embodying said method in a handheld unit.

20. The method as recited in claim 11 wherein said illuminating further comprises illuminating said upper Bragg reflector through an optical channel.

* * * * *